United States Patent
Andreasen

(10) Patent No.: US 8,267,009 B2
(45) Date of Patent: Sep. 18, 2012

(54) NUTCRACKER

(76) Inventor: Michael S. Andreasen, Nampa, ID (US)

( * ) Notice: Subject to any disclaimer, the term of this patent is extended or adjusted under 35 U.S.C. 154(b) by 640 days.

(21) Appl. No.: 12/360,849

(22) Filed: Jan. 27, 2009

(65) Prior Publication Data

US 2009/0193984 A1   Aug. 6, 2009

Related U.S. Application Data

(63) Continuation-in-part of application No. 11/066,698, filed on Feb. 24, 2005, now Pat. No. 7,481,157.

(51) Int. Cl.
*A47J 43/00* (2006.01)
(52) U.S. Cl. .......................................... 99/575
(58) Field of Classification Search ............... 99/575, 99/625, 628

See application file for complete search history.

(56) References Cited

U.S. PATENT DOCUMENTS

| | | | | |
|---|---|---|---|---|
| 807,551 A * | 12/1905 | Gordon | ............. | 99/575 |
| 1,025,405 A * | 5/1912 | King | ............. | 99/575 |
| 1,117,726 A * | 11/1914 | Varga | ............. | 99/578 |
| 1,194,318 A * | 8/1916 | Power | ............. | 99/575 |
| 1,211,978 A * | 1/1917 | Spitz | ............. | 99/570 |
| 1,234,767 A * | 7/1917 | Junker | ............. | 99/593 |
| 1,255,808 A * | 2/1918 | Spencer | ............. | 99/581 |
| 1,266,075 A * | 5/1918 | Spitz | ............. | 99/570 |
| 1,274,803 A * | 8/1918 | Spitz | ............. | 426/483 |
| D67,329 S * | 5/1925 | Bagby | ............. | D7/508 |
| 1,688,966 A * | 10/1928 | Hill | ............. | 99/575 |
| 1,883,529 A * | 10/1932 | Buckwalter | ............. | 30/120.2 |
| 2,129,679 A * | 9/1938 | Dragon | ............. | 99/575 |
| 2,138,302 A | 11/1938 | Kilner | | |
| 2,220,320 A * | 11/1940 | Dragon | ............. | 99/570 |
| 2,302,227 A * | 11/1942 | Kasser | ............. | 426/482 |
| 2,377,369 A * | 6/1945 | Potter | ............. | 30/120.2 |
| 2,505,538 A * | 4/1950 | Gehrke | ............. | 99/583 |
| 2,506,970 A * | 5/1950 | Paul | ............. | 99/581 |
| 2,543,537 A * | 2/1951 | Smith | ............. | 99/575 |
| 2,571,214 A * | 10/1951 | Dale | ............. | 99/582 |
| 2,572,378 A * | 10/1951 | Paul | ............. | 99/581 |
| 2,695,642 A * | 11/1954 | White | ............. | 99/572 |
| 2,703,522 A * | 3/1955 | Smith | ............. | 100/283 |
| 2,740,439 A * | 4/1956 | Dillard | ............. | 99/579 |

(Continued)

OTHER PUBLICATIONS

"Embarcadero Home Canner: The World's Best Nutcracker" Dec. 22, 2004 http://www.ehcan.com/Nutcracker.html.

(Continued)

*Primary Examiner* — Henry Yuen
*Assistant Examiner* — Eric Stapleton
(74) *Attorney, Agent, or Firm* — Pedersen and Company, PLLC; Ken J. Pedersen; Barbara S. Pedersen

(57) ABSTRACT

A nutcracker utilizes a cone with a textured exterior surface rotatably mounted and centered inside a vertical cylinder with a textured interior surface. The textured exterior surface and the textured interior surface are non-parallel and form a cracking zone that becomes smaller in the downward direction. As the conical member rotates, gravity rolls nuts down in a spiraling path, between and along the preferred elongated and slanted protrusions forming the texture. This path takes the nuts into an increasingly smaller cracking zone until the pressure on the nuts from the conical and cylindrical members causes the nut-shells to crack and the nuts typically to break into halves and thirds. The nutcracker may include an adjustable barrel that rolls up and down inside a housing, for changing the minimum width of the cracking zone.

18 Claims, 32 Drawing Sheets

U.S. PATENT DOCUMENTS

| | | | | |
|---|---|---|---|---|
| 2,753,906 A | * | 7/1956 | Burchett | 30/124 |
| 2,804,111 A | * | 8/1957 | Burchett | 30/120.3 |
| 3,019,828 A | * | 2/1962 | Pava | 99/583 |
| 3,138,823 A | | 6/1964 | Langner | |
| 3,347,295 A | * | 10/1967 | Feiling | 99/628 |
| 3,578,047 A | * | 5/1971 | Diggs | 99/572 |
| D221,977 S | * | 9/1971 | Pike | D7/680 |
| D222,879 S | * | 1/1972 | Pike | D7/680 |
| D222,980 S | * | 2/1972 | Pike | D7/680 |
| 3,688,825 A | * | 9/1972 | Hall | 30/120.2 |
| 3,713,468 A | * | 1/1973 | Walsh | 99/580 |
| 4,044,663 A | * | 8/1977 | Straw | 99/577 |
| 4,182,226 A | * | 1/1980 | Sigas | 99/578 |
| 4,252,056 A | * | 2/1981 | Altman | 99/551 |
| D267,301 S | * | 12/1982 | Hunt | D7/680 |
| 4,370,922 A | * | 2/1983 | Rollband | 99/572 |
| 4,377,970 A | * | 3/1983 | Kenkel | 99/572 |
| 4,426,922 A | * | 1/1984 | Yamamoto | 99/519 |
| 4,466,343 A | * | 8/1984 | Thompson | 99/572 |
| 4,467,711 A | * | 8/1984 | Oiso et al. | 99/577 |
| 4,787,307 A | * | 11/1988 | Rollband | 99/572 |
| 4,819,331 A | | 4/1989 | Joyama | |
| 4,907,840 A | | 3/1990 | Hawkins | |
| 4,909,140 A | * | 3/1990 | Burlock et al. | 510/522 |
| 4,928,590 A | | 5/1990 | Joyama et al. | |
| 4,944,219 A | * | 7/1990 | Hambright et al. | 99/581 |
| 4,980,188 A | * | 12/1990 | Burlock et al. | 426/482 |
| 4,996,917 A | * | 3/1991 | Burlock et al. | 99/575 |
| 5,076,158 A | | 12/1991 | Tippett | |
| 5,092,231 A | * | 3/1992 | Smith | 99/572 |
| 5,239,918 A | * | 8/1993 | Whaling | 99/571 |
| 5,390,591 A | * | 2/1995 | Fast | 99/578 |
| 5,404,809 A | * | 4/1995 | Ham | 99/575 |
| RE35,789 E | * | 5/1998 | Amstad | 99/625 |
| 6,041,697 A | * | 3/2000 | Maoz | 99/572 |
| 6,163,962 A | * | 12/2000 | Ganguzza | 30/120.1 |
| D452,637 S | * | 1/2002 | Reed et al. | D7/680 |
| 6,397,737 B1 | | 6/2002 | Eisel | |
| 7,234,393 B2 | * | 6/2007 | Lindsey et al. | 99/571 |
| 7,374,114 B1 | * | 5/2008 | Pekay et al. | 241/169 |
| 7,481,157 B2 | * | 1/2009 | Andreasen | 99/575 |
| 2006/0112839 A1 | * | 6/2006 | Lindsey et al. | 99/574 |

OTHER PUBLICATIONS

"Universal Nutcracker: Works on all varieties of round nuts" Dec. 22, 2004 http://www.universalnutcracker.com/specs.html.

* cited by examiner

NUTCRACKER

This application is a continuation-in-part of U.S. Non-Provisional application Ser. No. 11/066,698, filed Feb. 24, 2005 and issuing as U.S. Pat. No. 7,481,157 on Jan. 27, 2009, the entire disclosure of which is incorporated herein by this reference.

BACKGROUND OF THE INVENTION

1. Field of the Invention

The present invention relates to machines for cracking multiple nuts. More particularly, it cracks nuts by rolling them between two surfaces that move relative to one another, and that are closer together, thus forming a smaller cracking zone nearer the lower ends of the two surfaces. Pressure on the nuts increases as gravity pulls the nuts downward into said smaller cracking zone.

2. Related Art

Power, U.S. Pat. No. 1,194,318, discloses a conical hopper, a conical rotor mounted within the hopper, means for operating the rotor, there being a downwardly decreasing interspace between the rotor and the hopper, the hopper being provided with downwardly ranging channels formed in its inner walls, and the rotor being provided with spirally produced channels in its periphery, said channels in the hopper walls being angular in formation and separated by edge portions to which the material is presented upon the rotation of the rotor, and the rotor being provided in the channels with spaced pins projecting beyond the periphery of the rotor.

Spitz, U.S. Pat. No. 1,274,803, discloses a cone-shaped hopper or shell with vertically-disposed ribs on its upper portion and teeth on its bottom portion, and an upright conical member with spiral ribs on its upper portion and teeth on its lower member, the teeth of the hopper and conical member having abrupt faces facing in opposite directions.

Dragon, U.S. Pat. No. 2,129,679, discloses two conical members concentrically mounted one within the other so as to provide a downwardly diminishing substantially annular and conical space or chamber.

Kasser, U.S. Pat. No. 2,302,227, discloses a process of cracking and shelling nuts which consists in rolling the nuts between opposite compressible surfaces so that the nuts are partly embedded in said surfaces, and forcing the rolled nuts at intervals on said surfaces over rigid cracking surfaces.

SUMMARY OF THE INVENTION

The present invention is a nutcracker comprising a conical member with a textured exterior surface inside a vertical cylinder with a textured interior surface. The conical member is positioned so that its larger diameter end is downward and inside the vertical cylinder, to create a cracking zone between the exterior surface and the interior surface that decreases in dimension toward the bottom of the cracking zone. Nuts are placed between the conical member and the vertical cylinder, and, as the conical member rotates within the vertical cylinder, gravity forces the nuts to roll downward deeper into a cracking zone and increasing pressure from the conical member and the vertical cylinder causes the shells of the nuts to crack.

The conical member is preferably received inside the vertical cylinder to form a cone-cylinder unit, wherein the conical member is coaxial and concentric with the vertical cylinder. The vertical cylinder is preferably a right cylinder, with the interior surface of the cylinder being exactly vertical and the same circular diameter at all locations along the axial length of the cracking zone. The conical member is preferably a truncated right cone (or right conical frustum), so that its exterior surface is slanted outward from top to bottom and preferably does not having any curvature along any axial line, at all locations along the axial length of the cracking zone. The conical frustum is preferably hollow to save weight but may also be solid or semi-solid. While the preferred conical member is a truncated cone, non-truncated or substantially non-truncated cones may also be used, and the term "cone" is used herein and in the claims to include both "pointed" cones and truncated cones. Therefore, the annular space between the concentric cylinder and cone becomes the cracking zone, and its width preferably decreases linearly from top to bottom of the cracking zone.

The preferred nutcracker has a plate system that allows effective mounting and operation of the conical member rotating shaft and its bearings, and yet provides a slanted surface(s) that receive(s) cracked nuts and their shells and directs them into a slanted shoot or spout and out of the device. The especially-preferred nutcracker is adjustable to receive a wide variety of nut sizes, shapes, and types, by vertical adjustment of the vertical cylinder relative to the conical member. This vertical adjustment may be done by providing a housing that surrounds the cone-cylinder unit and providing a roller frame system that allows the cylinder to move up and down inside the housing.

BRIEF DESCRIPTION OF THE DRAWINGS

The accompanying drawings illustrate several aspects of embodiments of the present invention. The drawings are for the purpose only of illustrating preferred modes of the invention, and not intended to limit the invention to the particulars illustrated therein.

Figure 13:
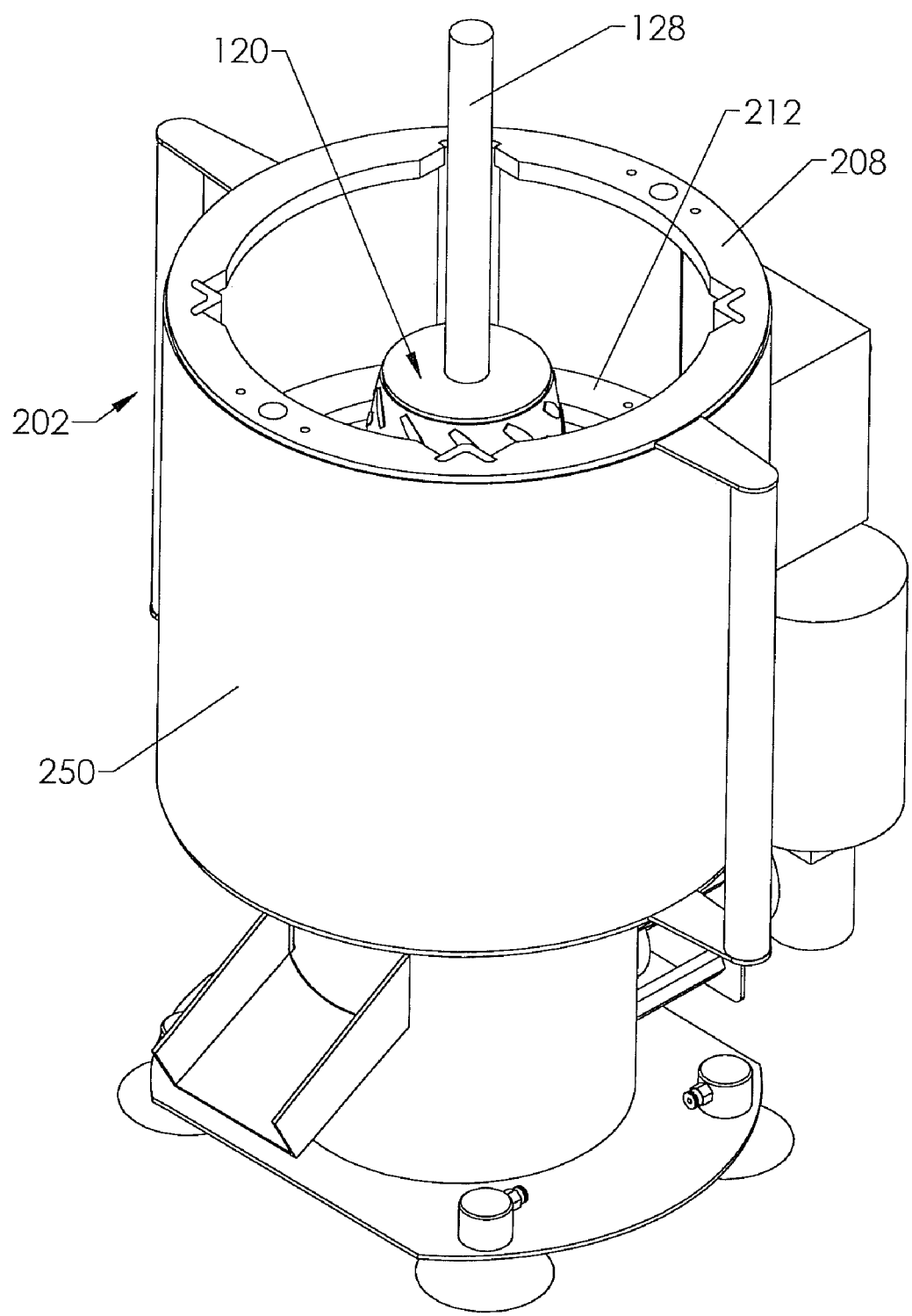
FIG. 13 is a front perspective view of the nutcracker of FIGS. 12A and B, with the barrel removed.
Figure 14:
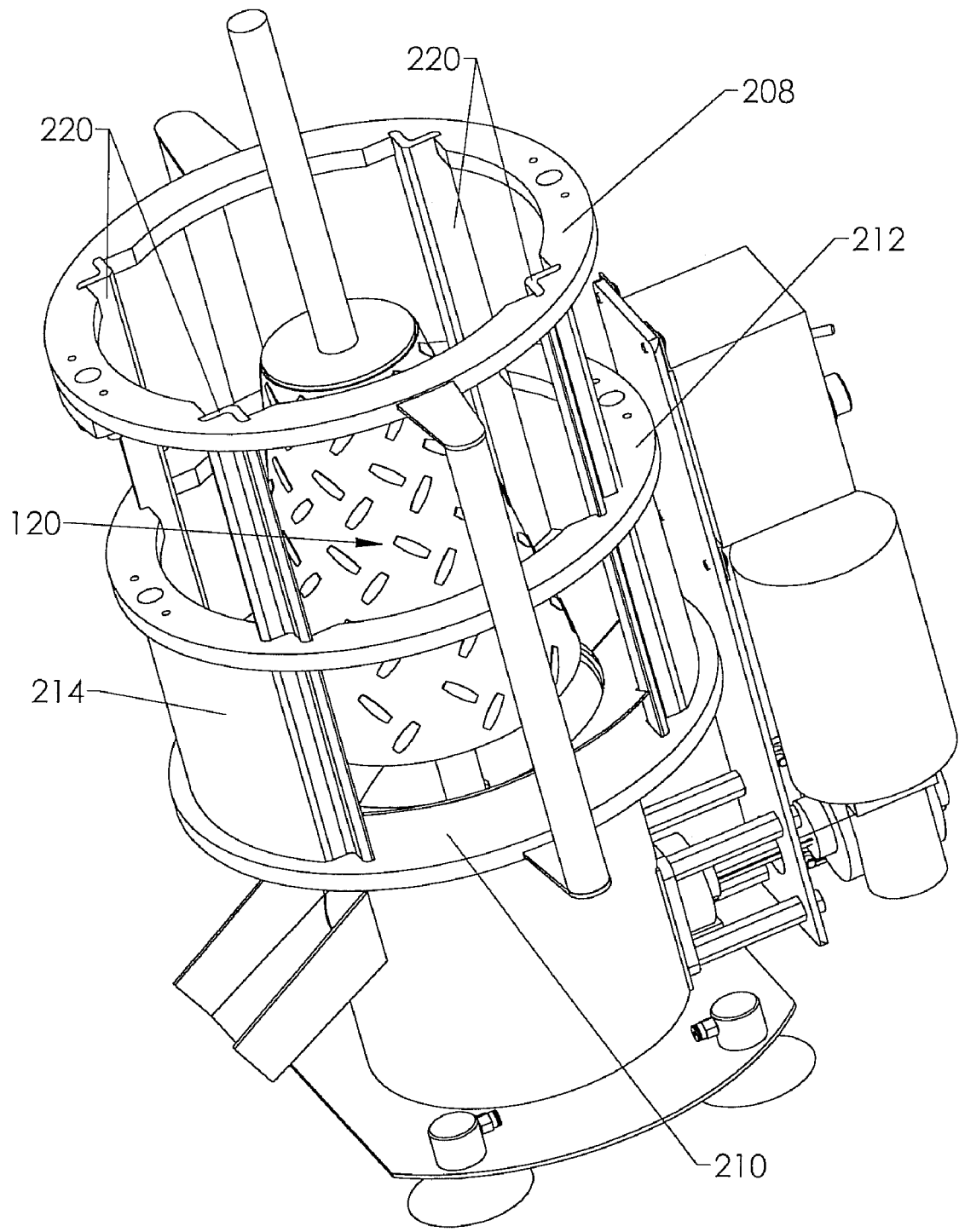

In the FIG. 14 is a side perspective view of the nutcracker portion of FIG. 13, with the outer housing wall removed, and multiple inner housing wall segments also removed.

Figure 15:
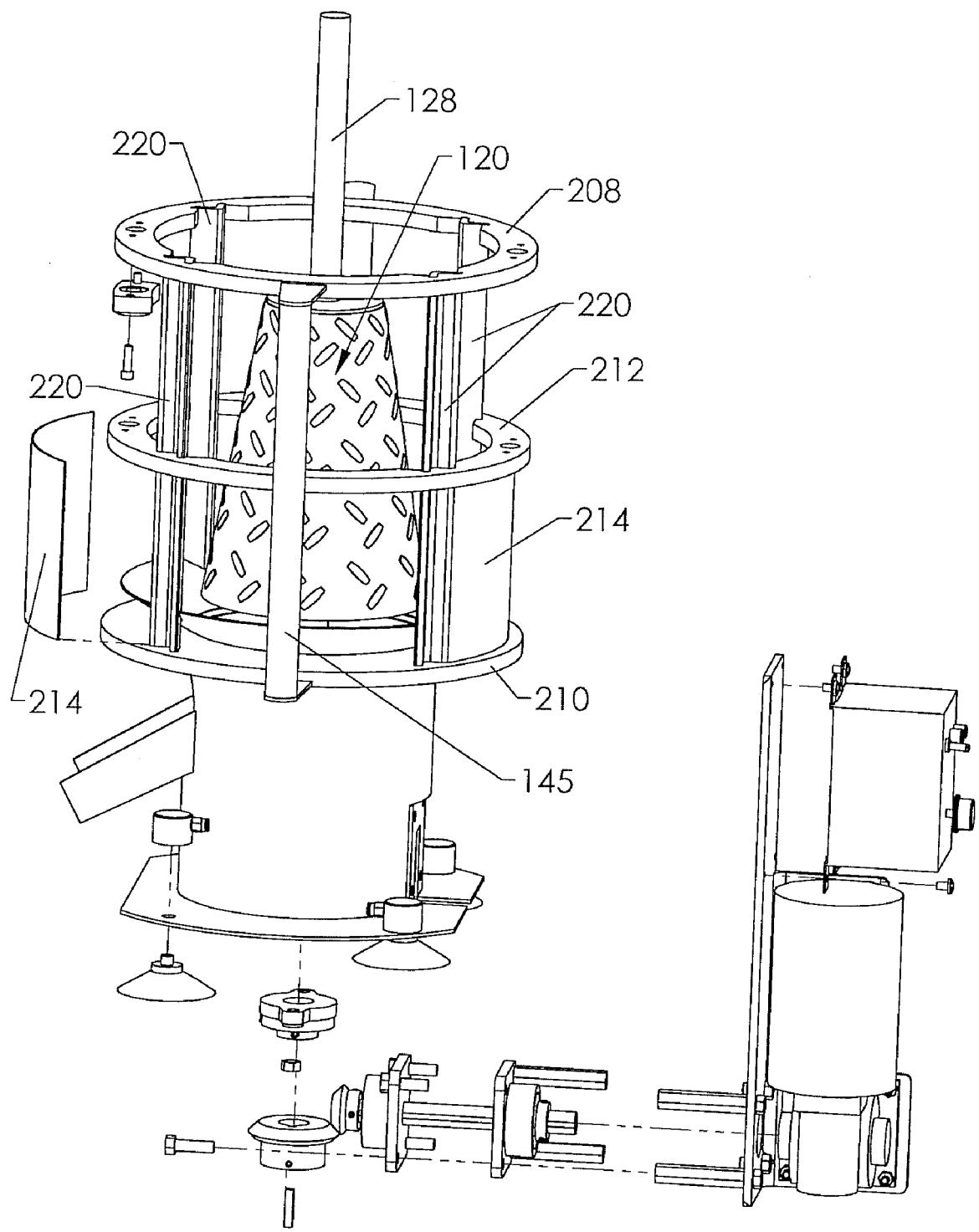

FIG. 15 is a side perspective, exploded view of the nutcracker portion of FIG. 14.

Figure 12A:
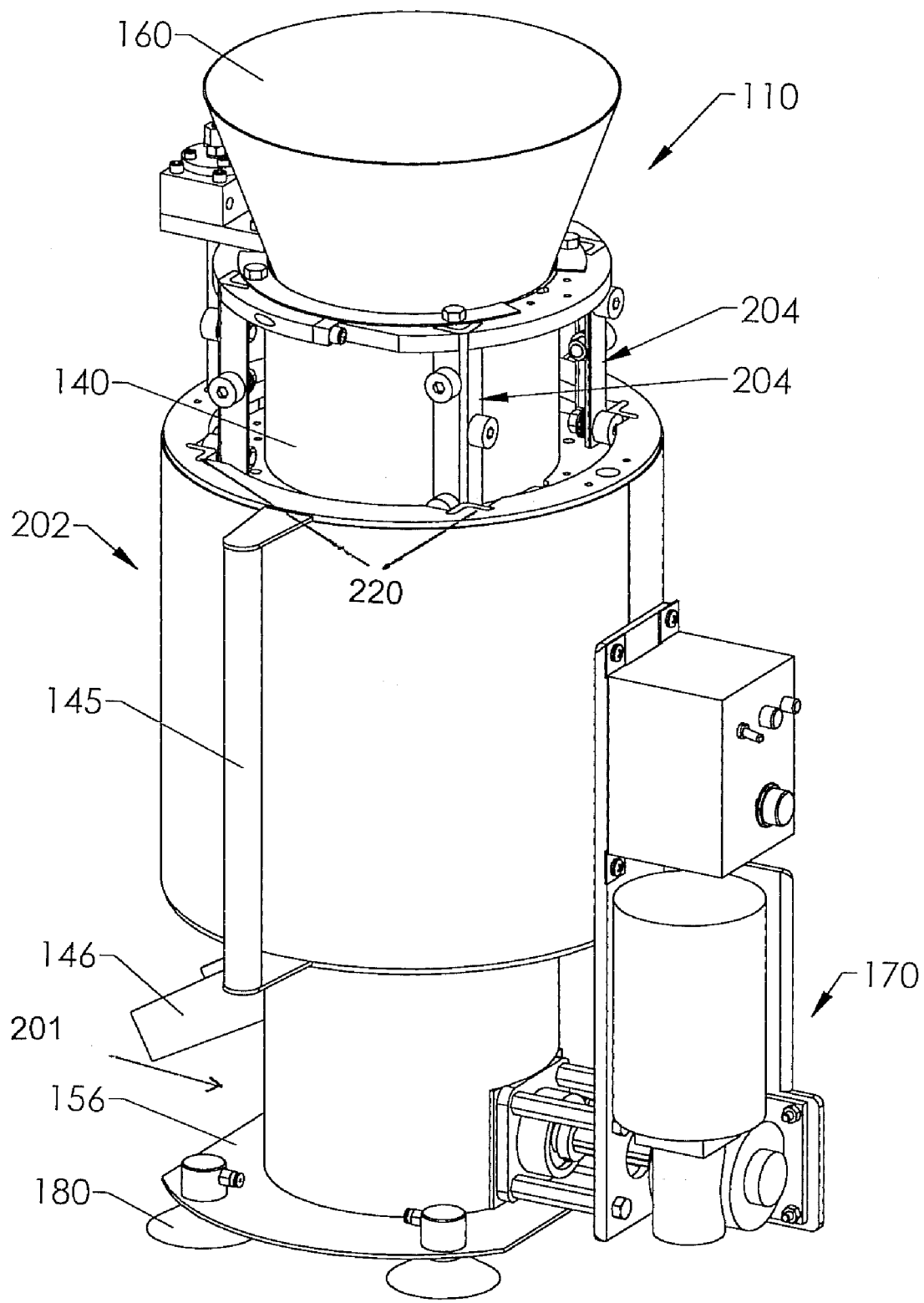
FIG. 12A is a side perspective view of another, especially-preferred, embodiment of the invented nutcracker, wherein the barrel is shown in the raised position.
Figure 16:
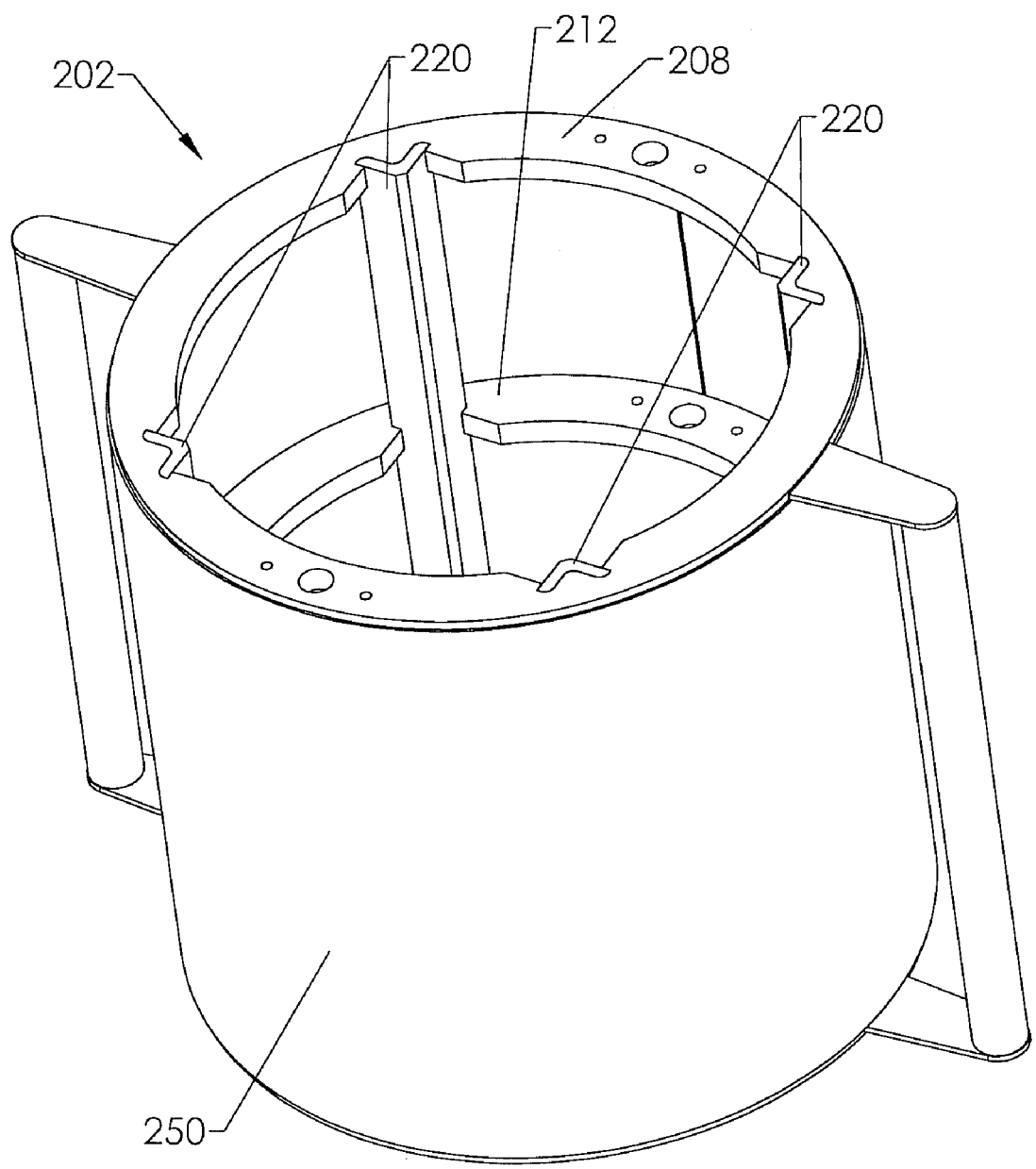

FIG. 16 is a perspective view of the housing of the nutcracker of FIGS. 12A and B and 13 (housing intact).

Figure 17:
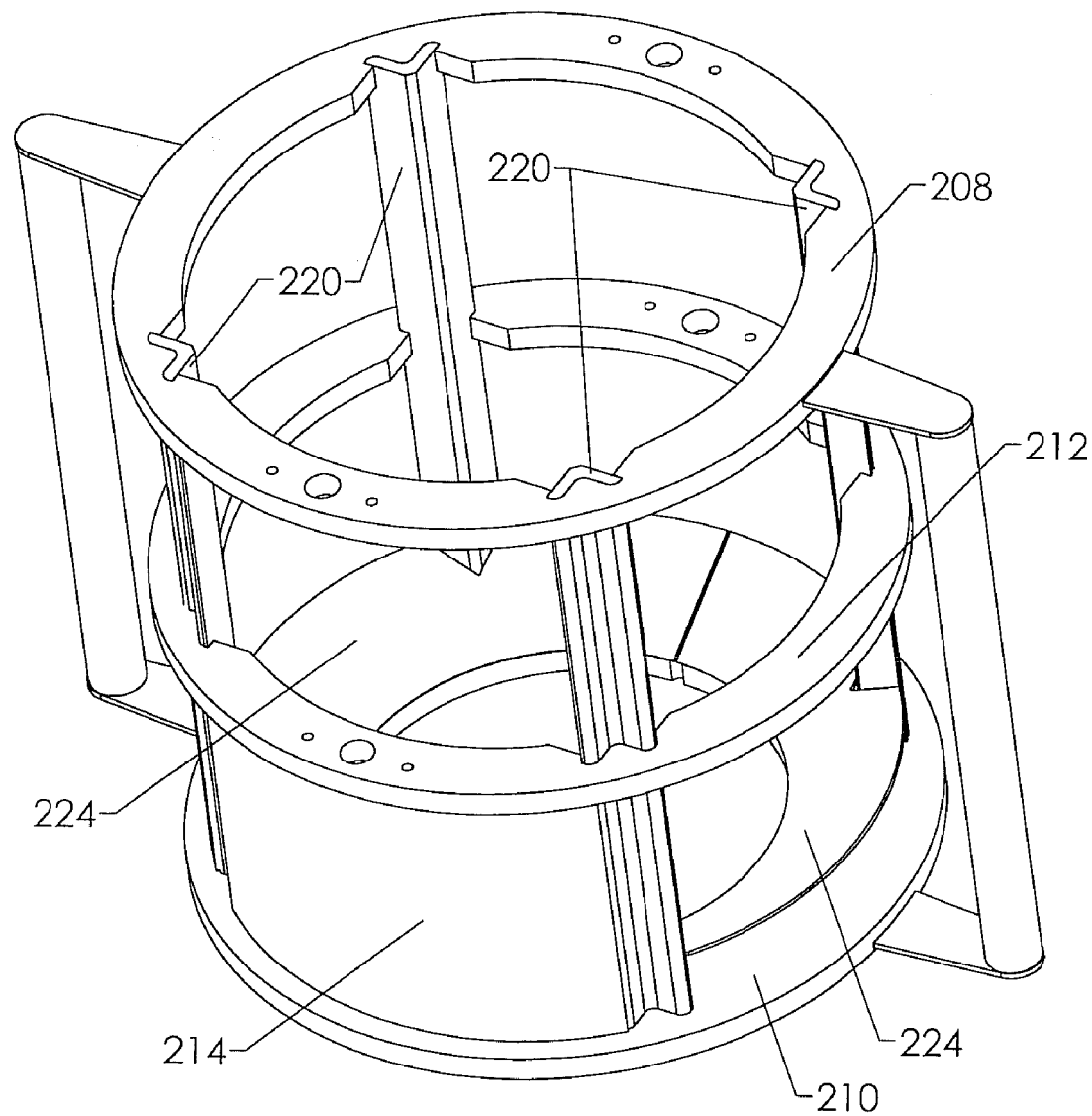

FIG. 17 is a perspective view of the housing of FIG. 16, with the outer housing wall and multiple of the inner housing wall segments removed.

Figure 12B:
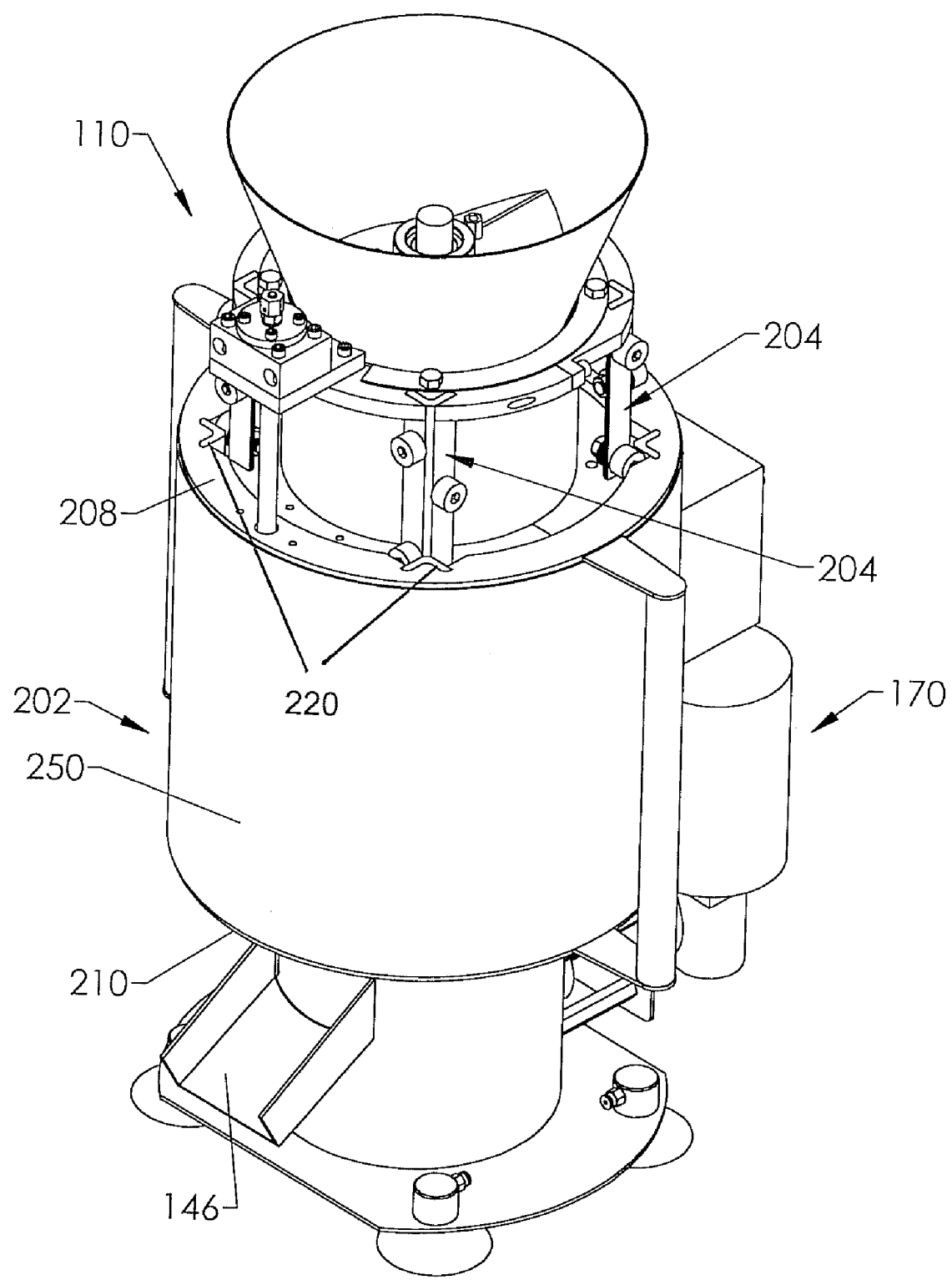
FIG. 12B is a front perspective view of the nutcracker of FIG. 12A, wherein the barrel is shown in the raised position.
Figure 12C:
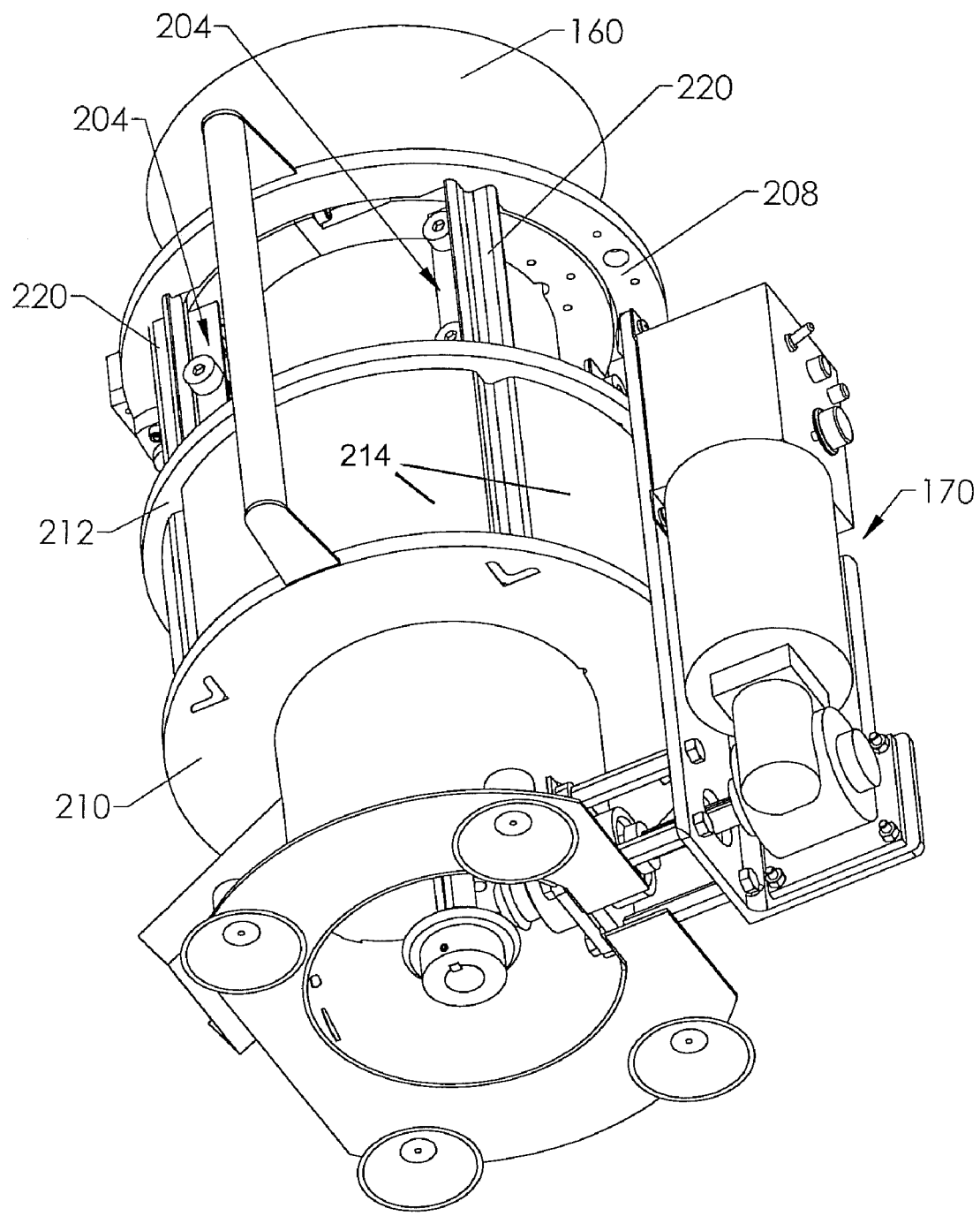
FIG. 12C is a bottom-rear perspective view of the nutcracker of FIGS. 12A and B, with the outer wall of the housing removed to reveal portions of the adjustment system of the nutcracker, and wherein the barrel is shown in the lowered position.
Figure 18A:
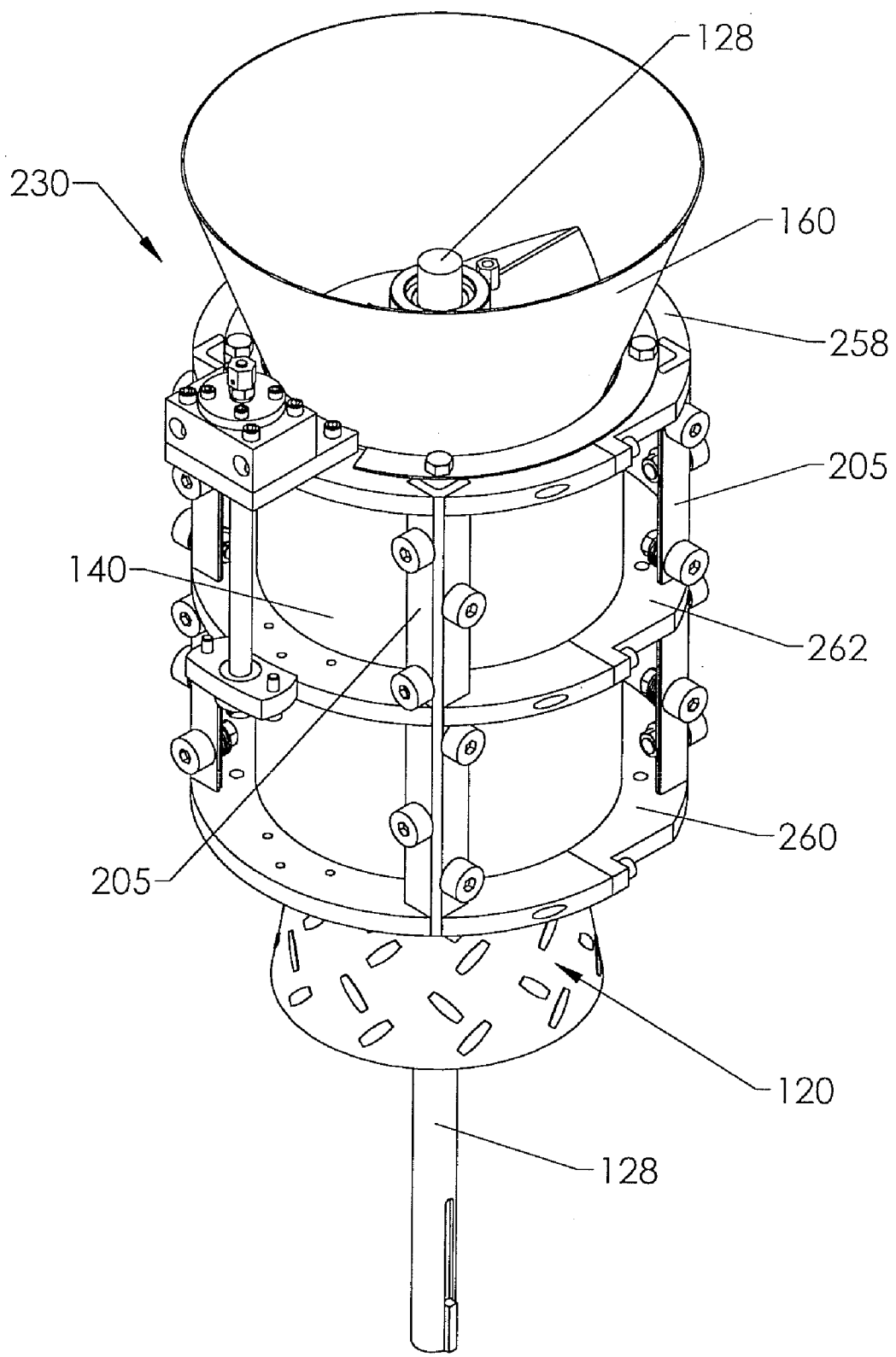

FIG. 18A is a top perspective view of the barrel-cone combination of the nutcracker of FIGS. 12A-C, wherein the barrel has been moved relative to the cone into a raised position.

Figure 18B:
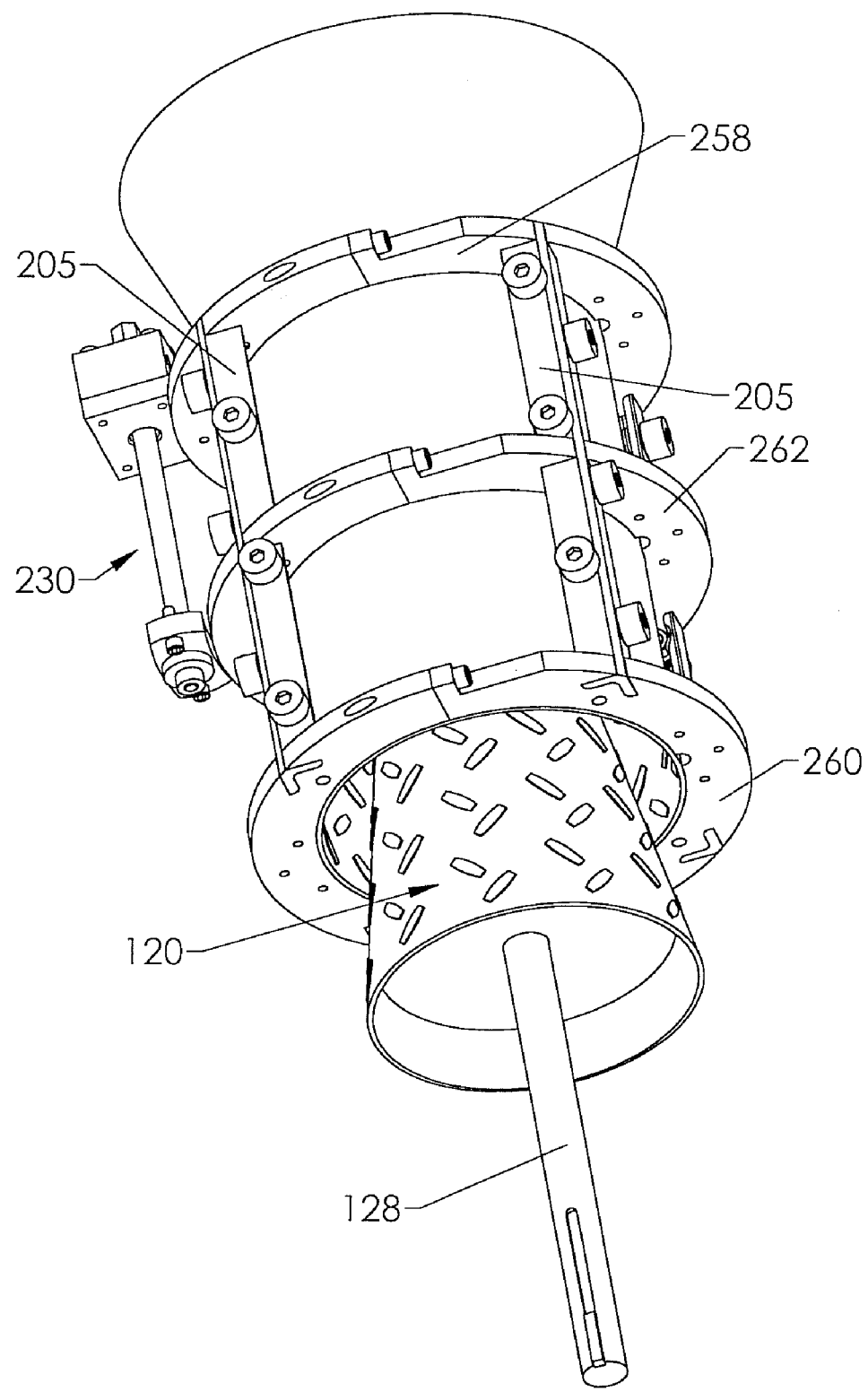

FIG. 18B is a bottom perspective view of the barrel-cone combination of FIG. 18A.

Figure 19:
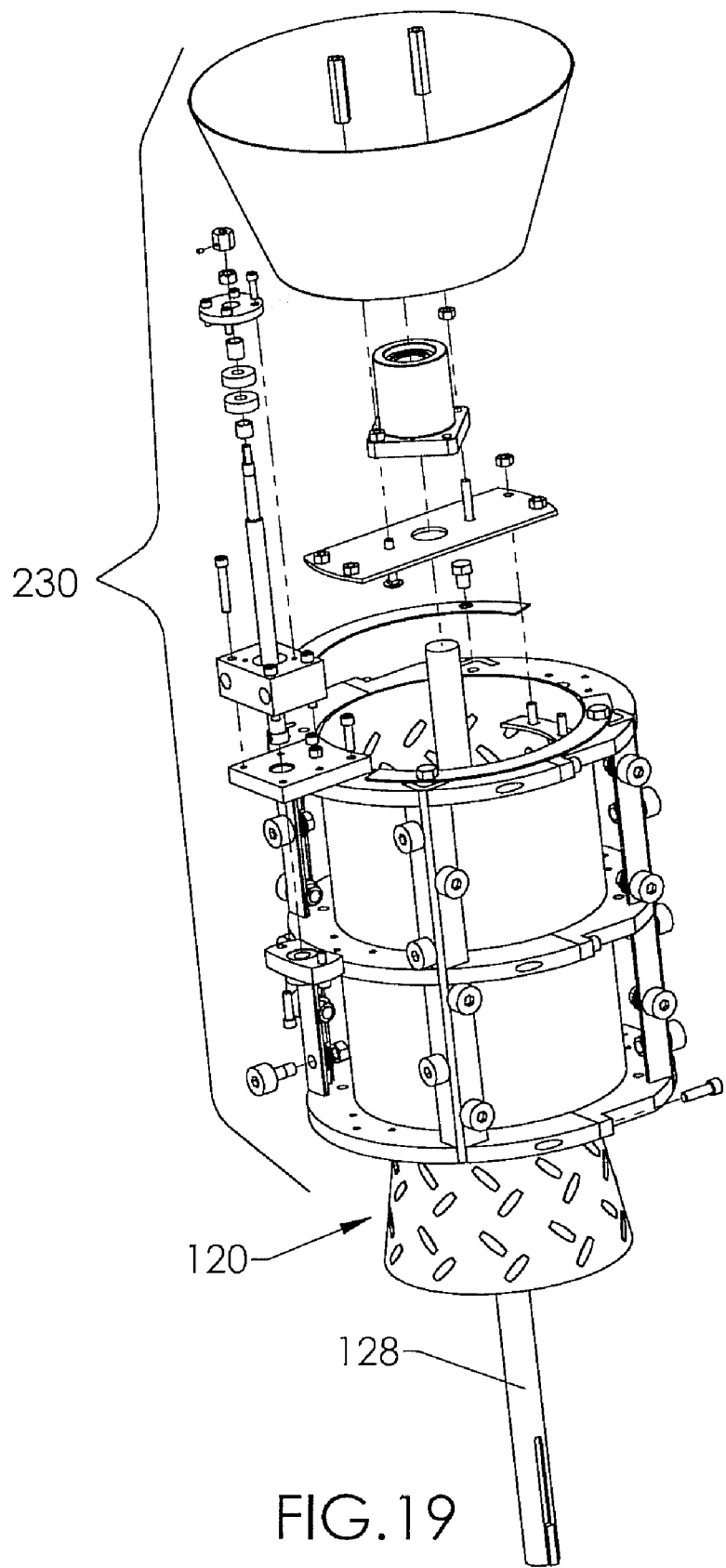

FIG. 19 is an exploded view of the barrel-cone combination of FIGS. 18A and B.

Figure 20:
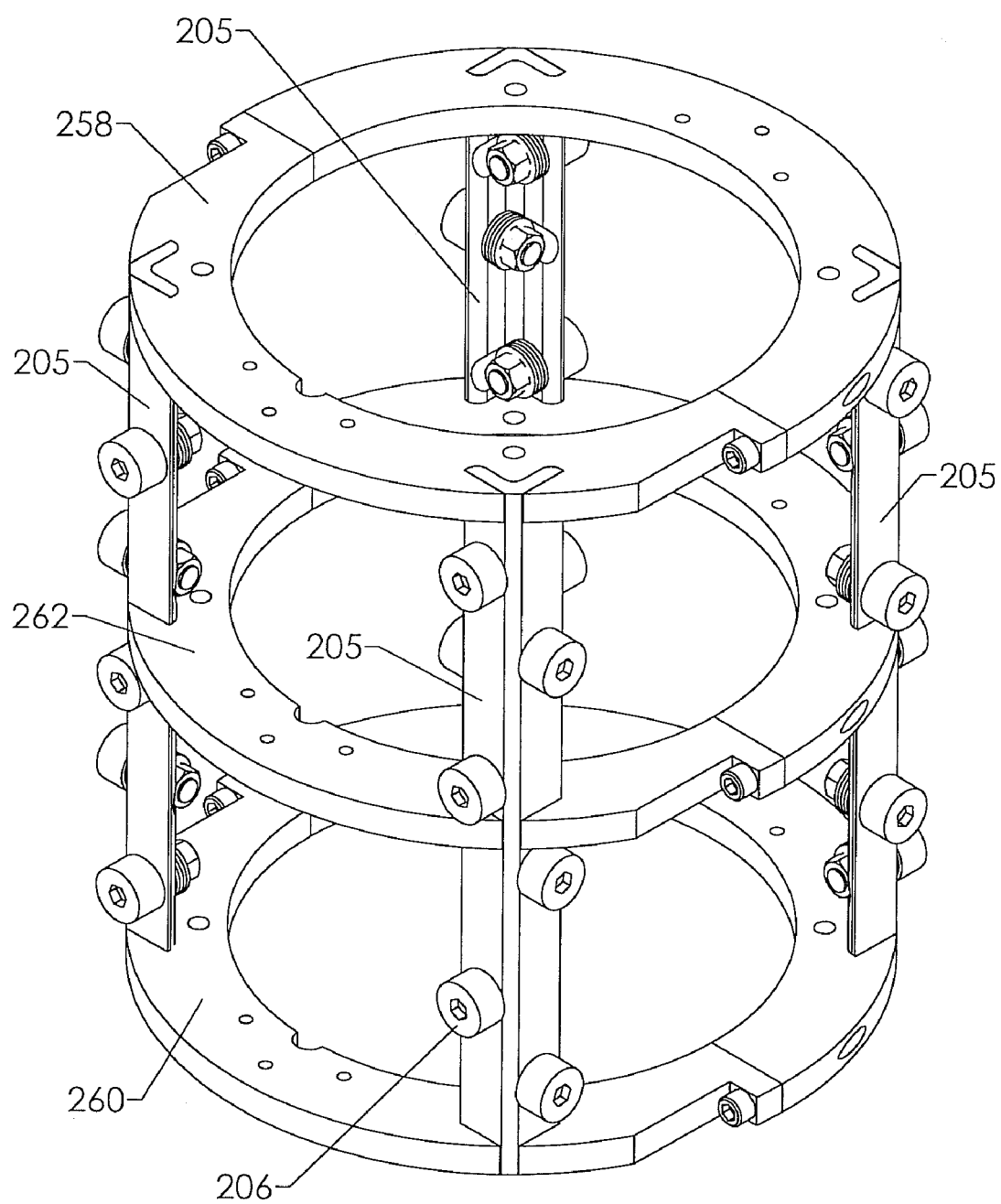

FIG. 20 is a perspective view of the roller frame of the preferred barrel of the nutcracker of FIGS. 12A-C.

Figure 21:
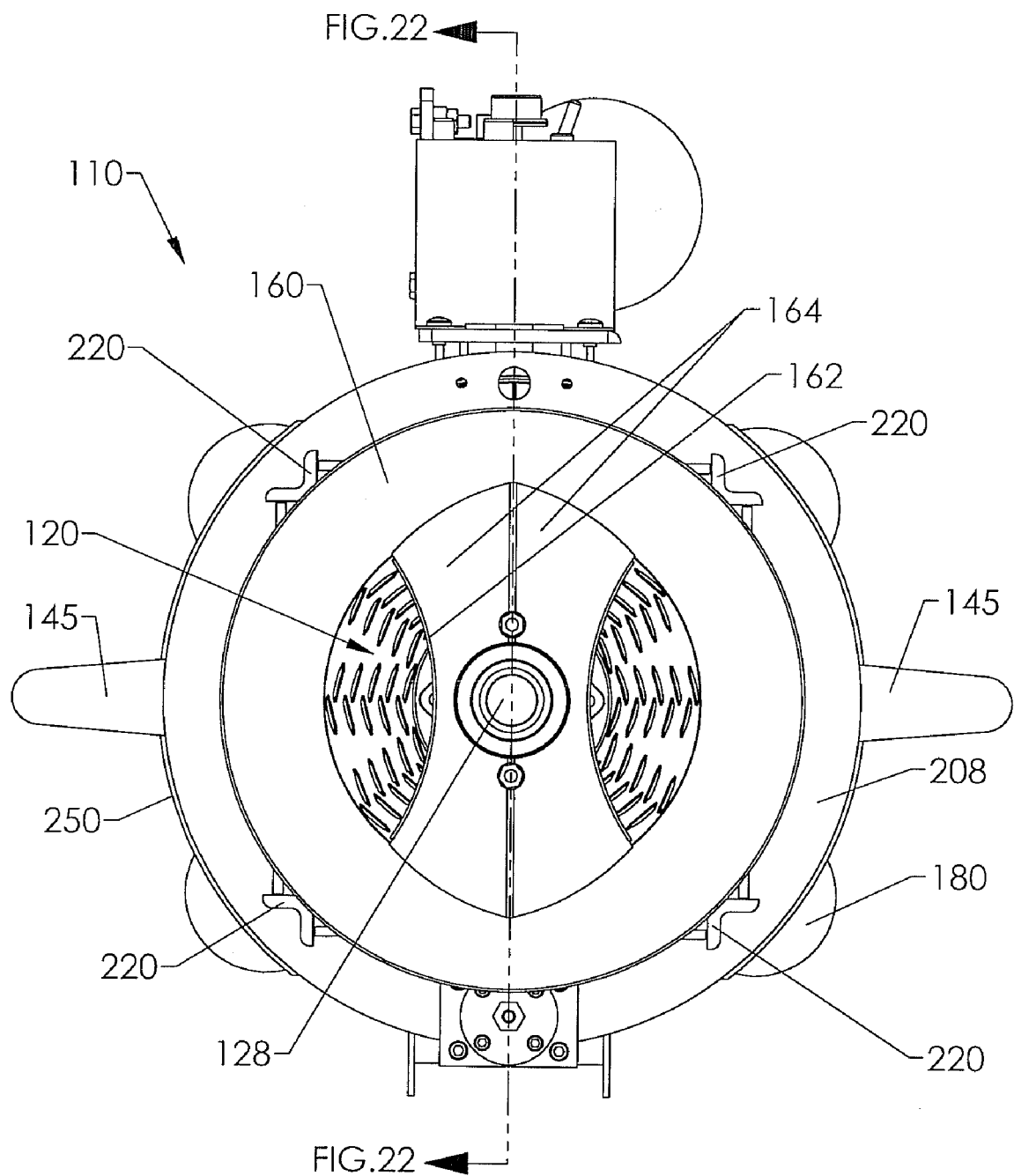

FIG. 21 is a top view of the nutcracker of FIGS. 12A and B.

Figure 22:
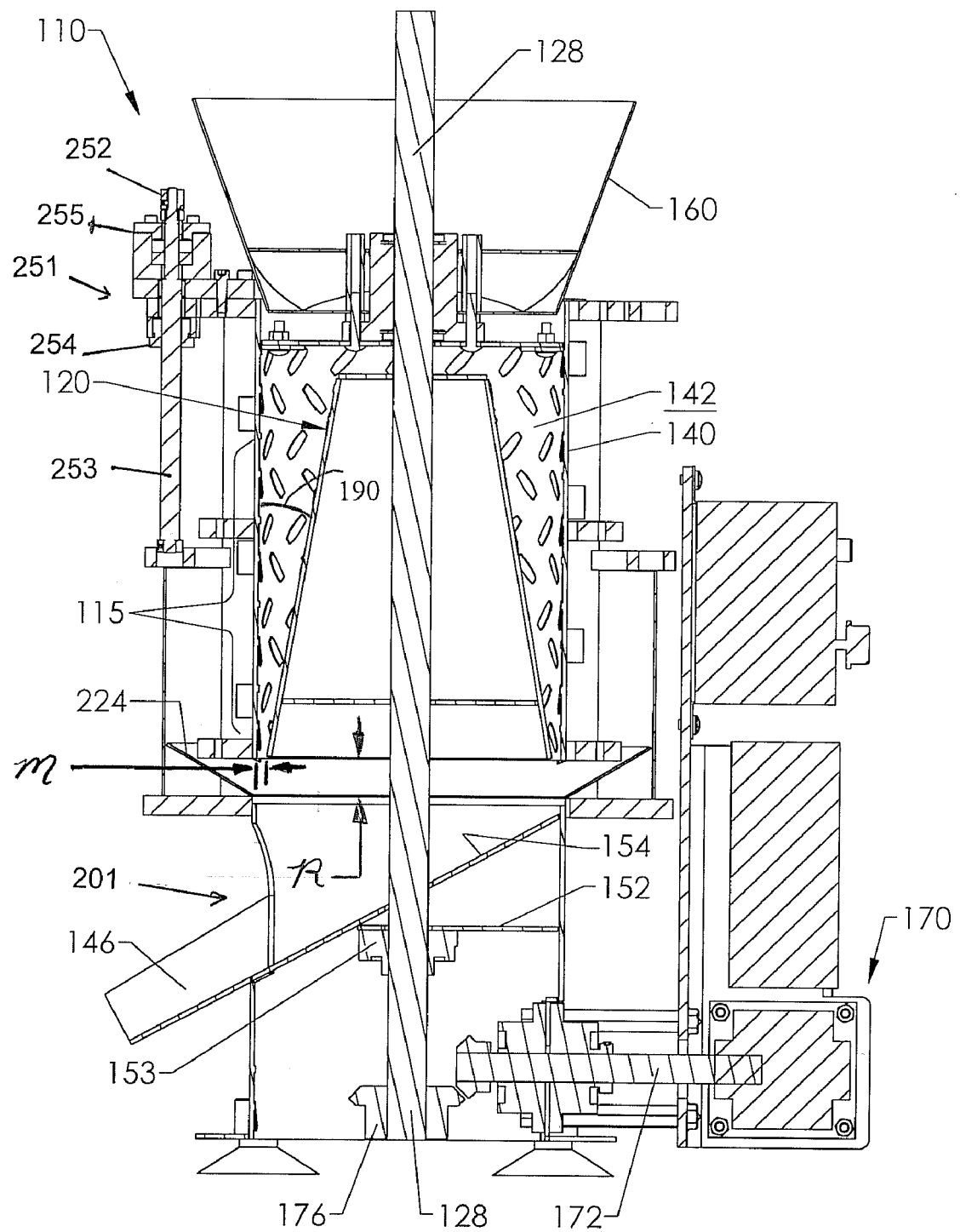

FIG. 22 is a cross-sectional view of the nutcracker of FIGS. 12A and B and 21, viewed along the line 22-22 in FIG. 21, wherein the barrel is in a lowered position relative to the conical unit.

Figure 23A:
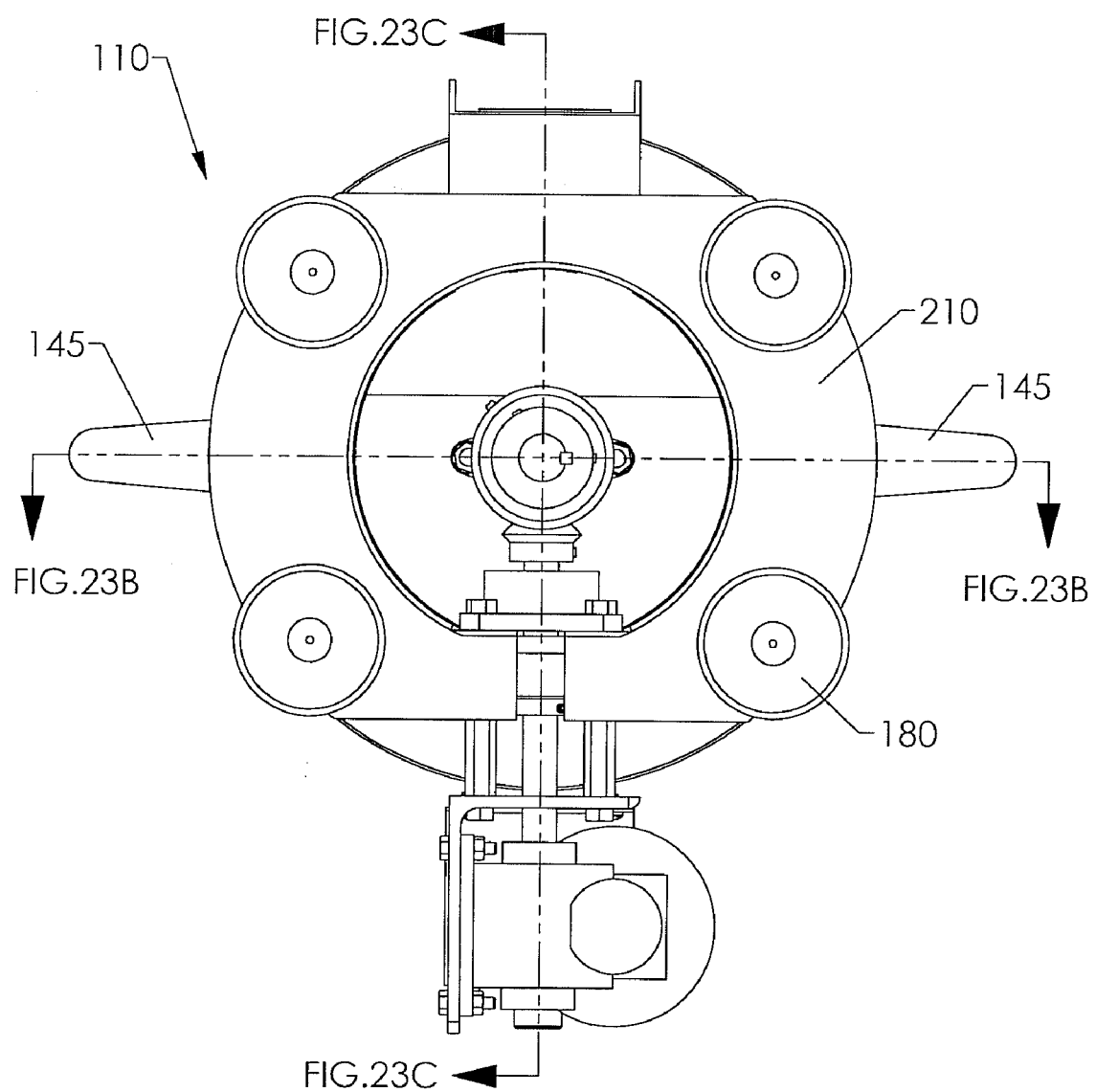

FIG. 23A is a bottom view of the nutcracker of FIGS. 12A and B and 21.

Figure 23B:
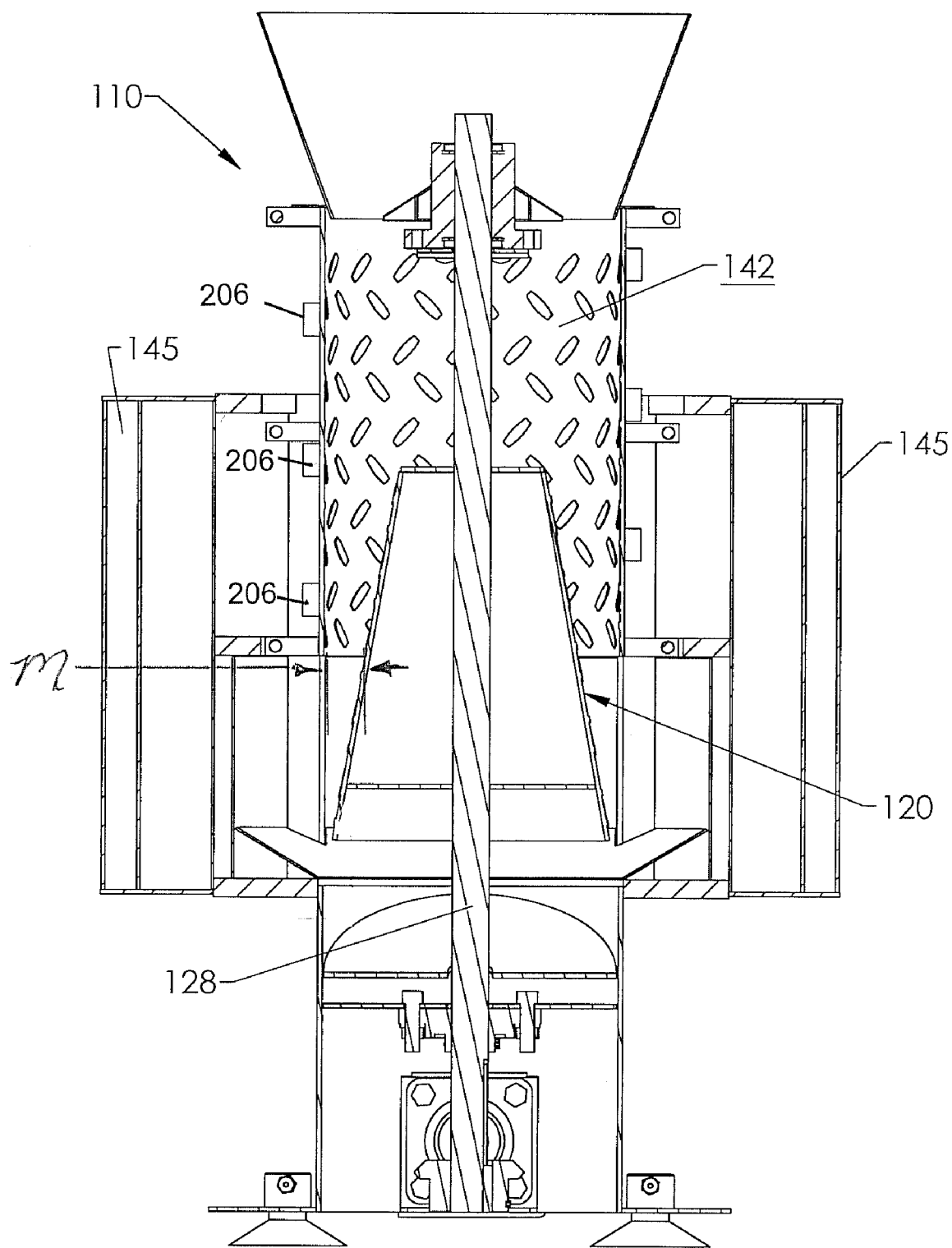

FIG. 23B is a cross-sectional view of the nutcracker of FIGS. 12A and B, 21, and 23A, viewed along the line 23B-23B in FIG. 23A, wherein the barrel is in the raised position.

Figure 23C:
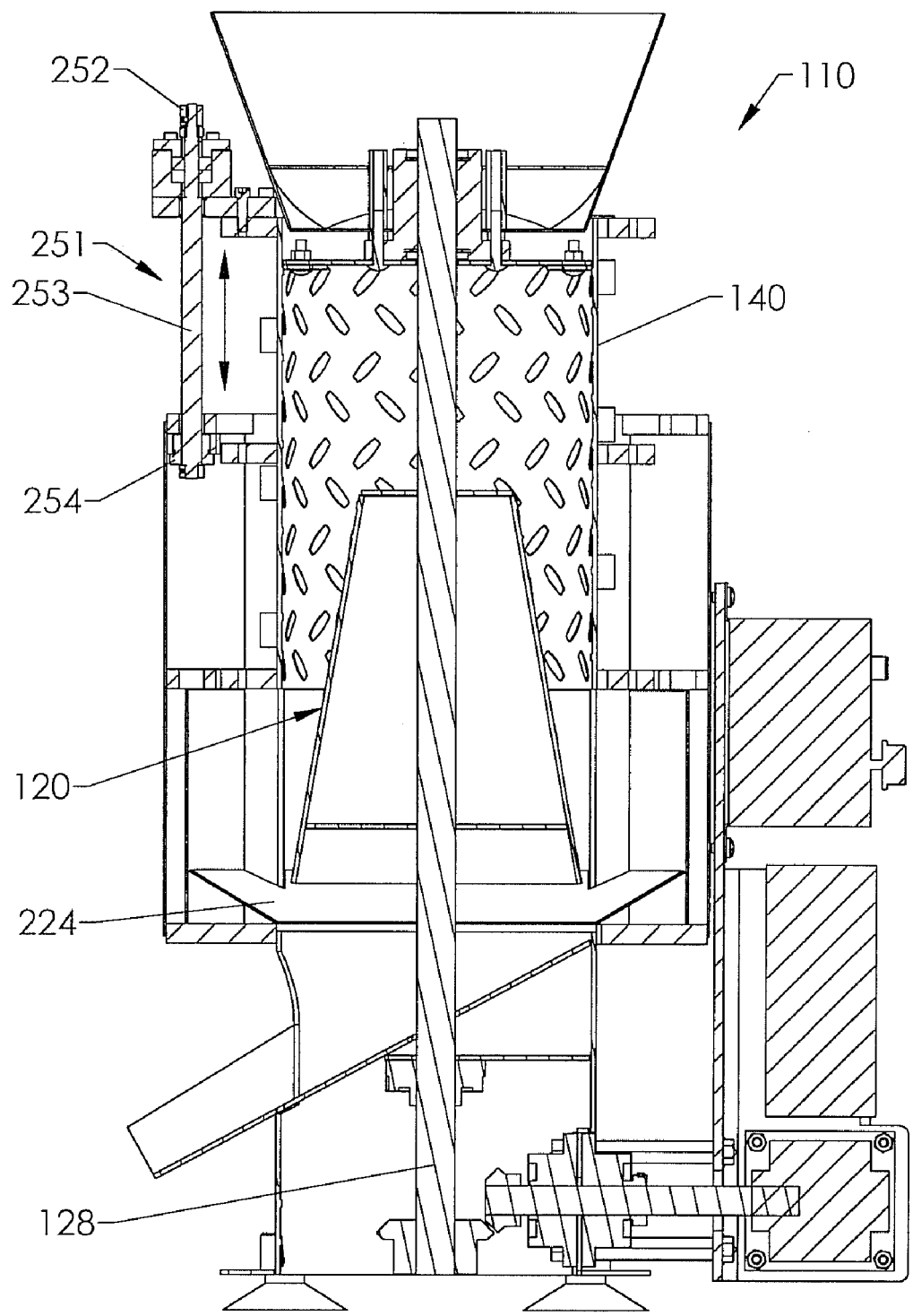

FIG. 23C is a cross-sectional view of the nutcracker of FIGS. 12A and B, 21 and 23A, viewed along the line 23C-23C in FIG. 23A, wherein the barrel is in the raised position.

Figure 24:
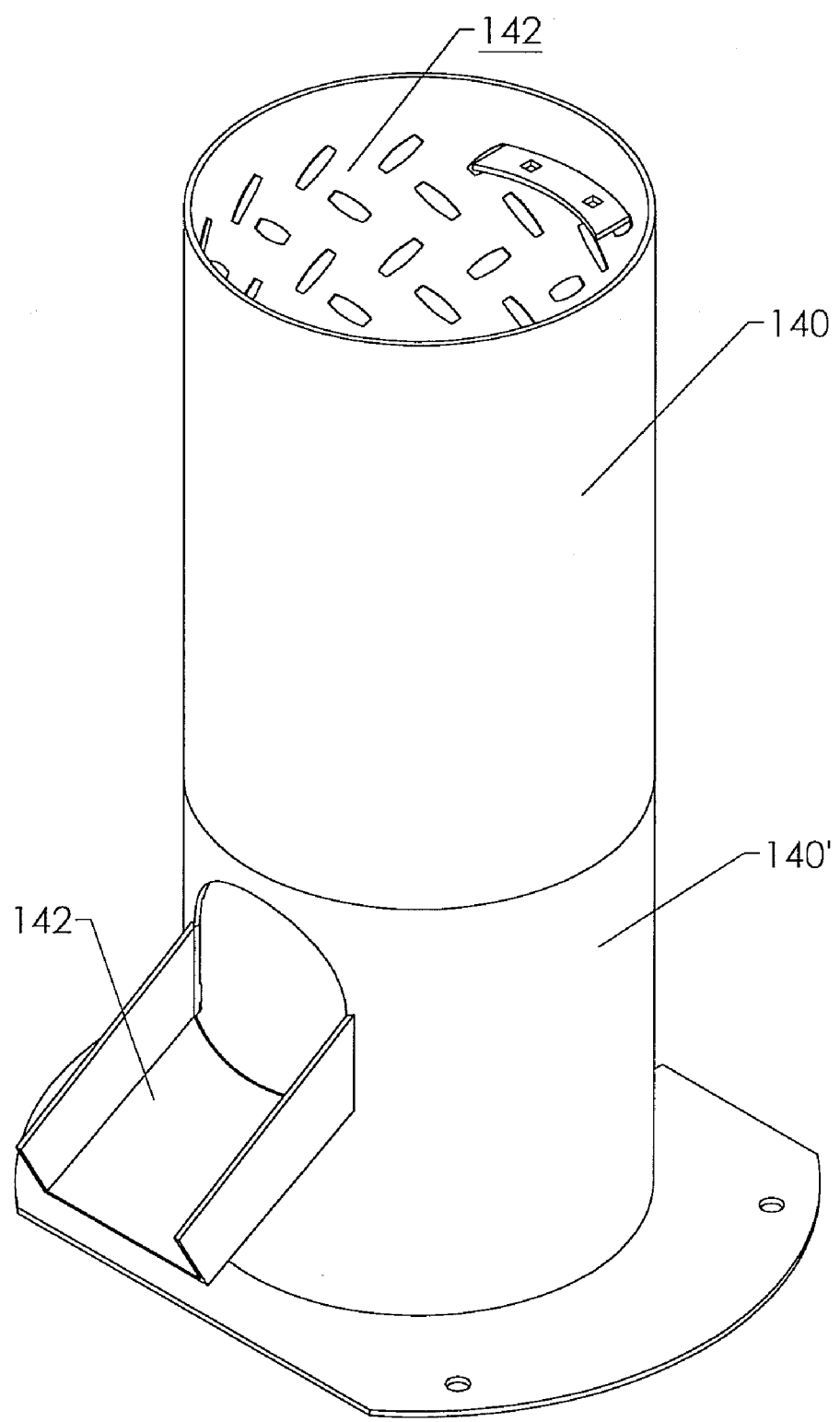

FIG. 24 is a perspective view of the cylinder of the barrel and the nut-exit base, removed from the nutcracker of FIGS. 12A-C. The cylinder is resting on, but not attached to, the nut-exit base, to illustrate the relative sizes of said cylinder and base and to show that the preferred cylinder and base may be the same or substantially the same diameter. As normally installed and used in the nutcracker, the cylinder will be coaxial with, but distanced above, the base, as is apparent from other figures for this embodiment.

Figure 25:
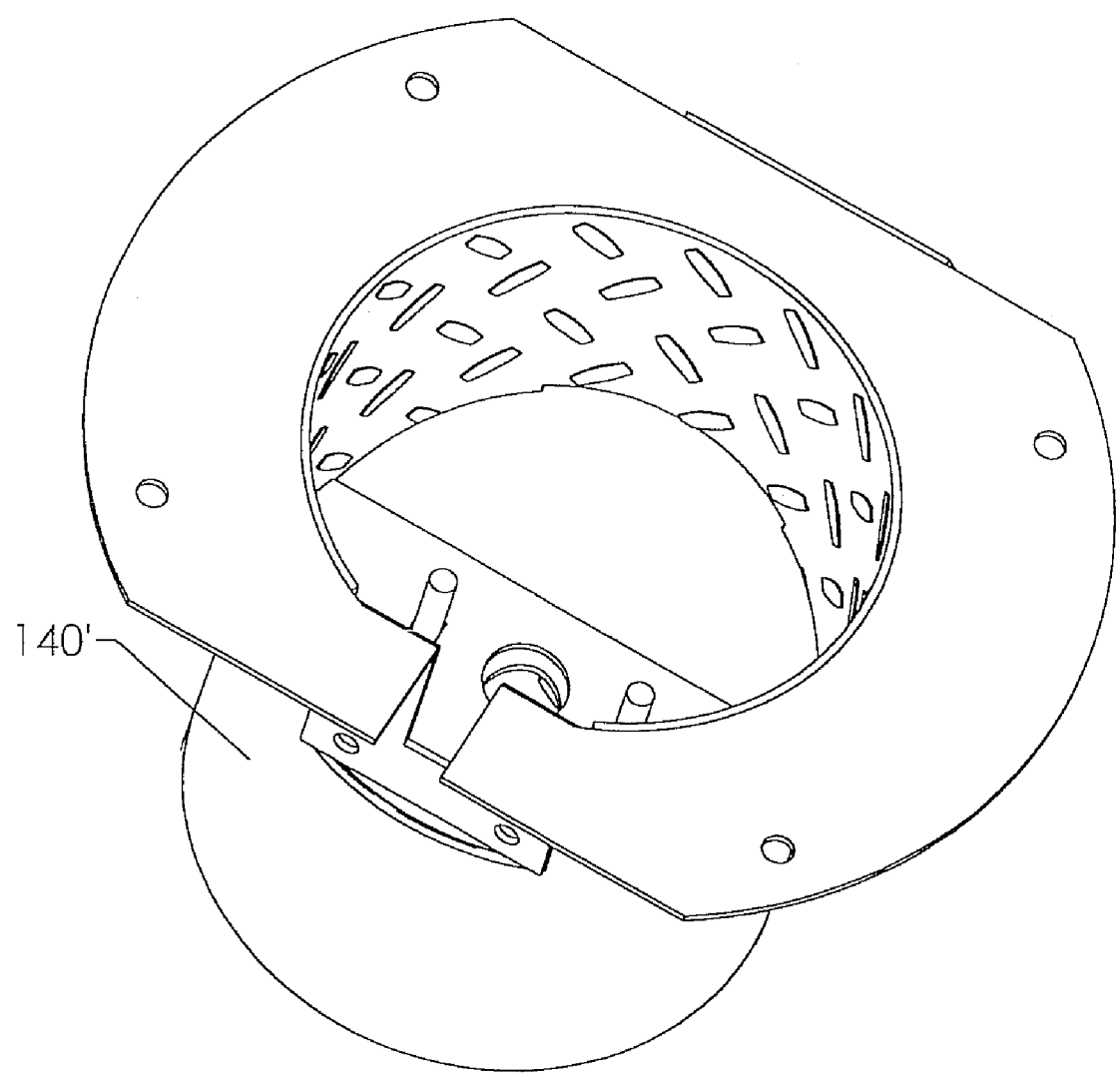

FIG. 25 is bottom perspective view of the nut-exit base of FIG. 24.

Figure 26:
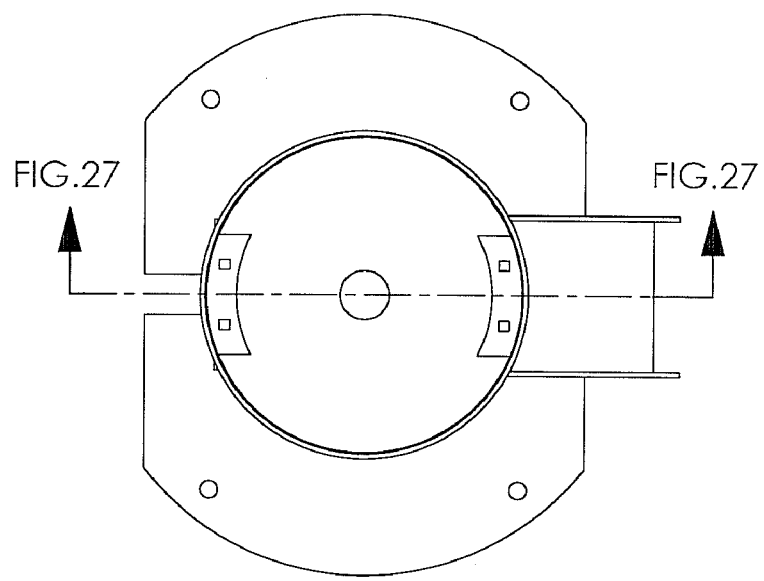

FIG. 26 is a top view of the cylinder and base of FIG. 24, again with the cylinder resting on top of the base.

Figure 27:
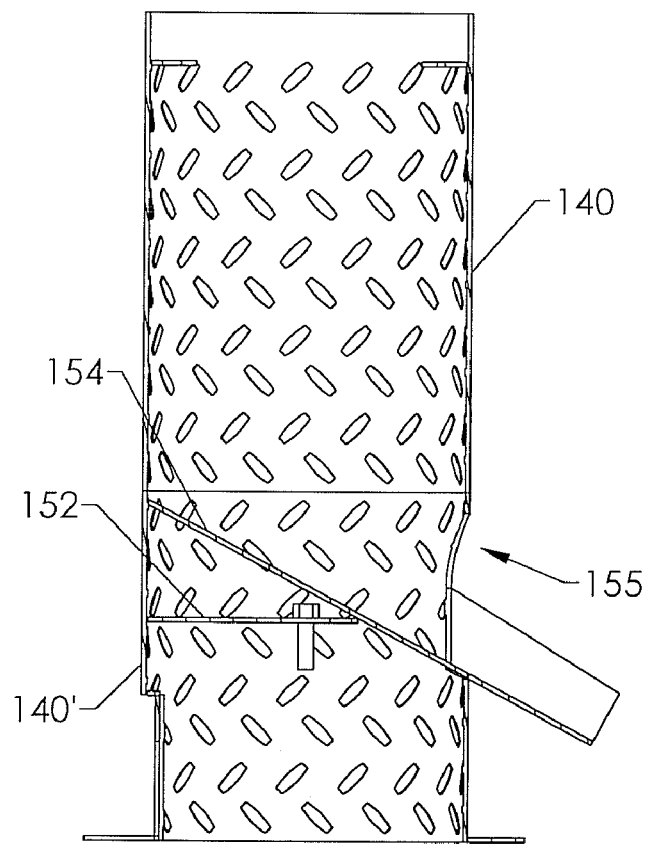

FIG. 27 is a cross-sectional view of the combination of FIGS. 24 and 26, viewed along 27-27 in FIG. 26.

Figures 28, 29A, 29B:
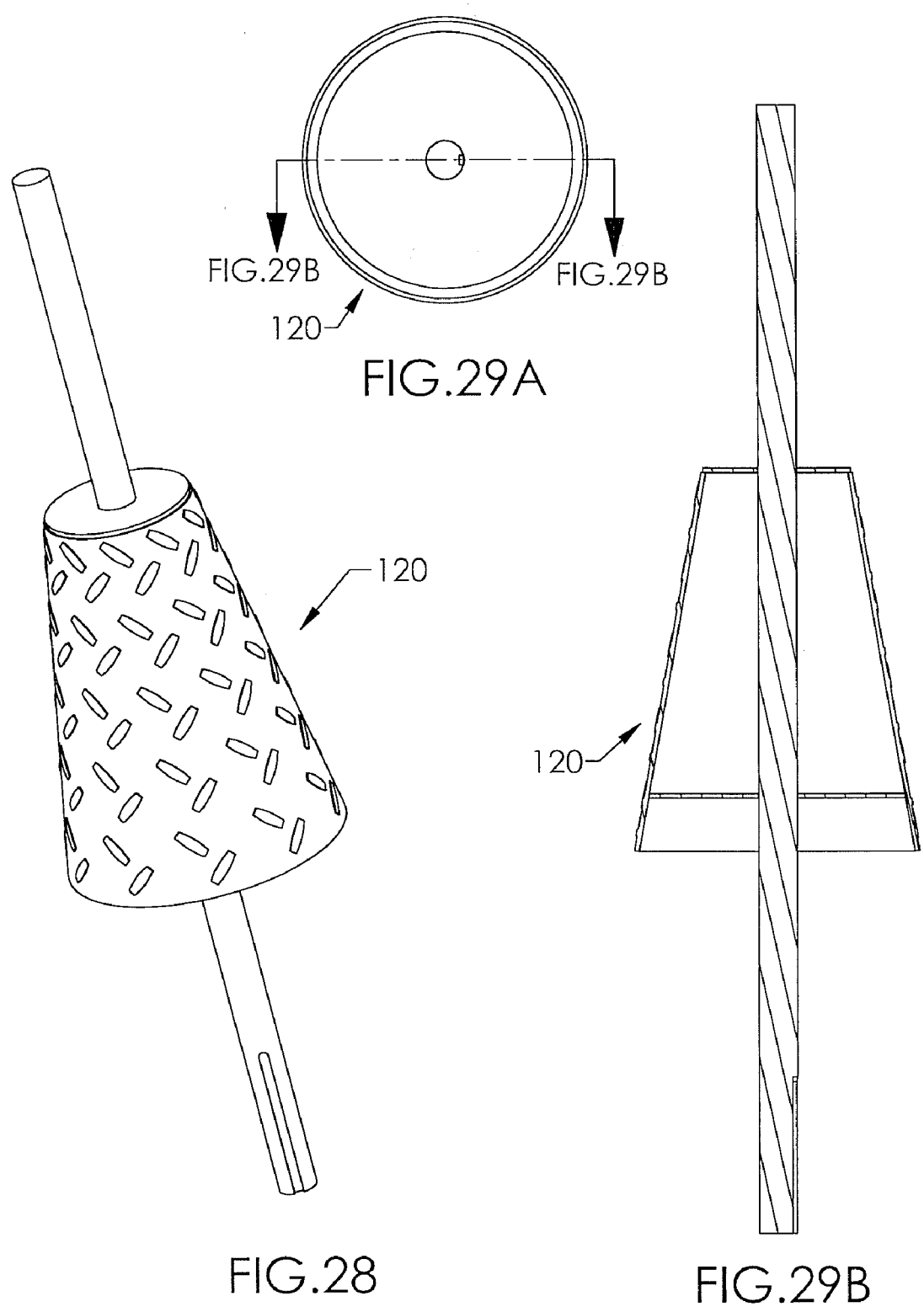

FIG. 28 is a side perspective view of the conical unit of the nutcracker of FIGS. 12A-C.

FIG. 29A is a bottom view of the conical unit of FIG. 28.

FIG. 29B is a cross-sectional view of the conical unit of FIGS. 28 and 29A, viewed along the line 29B-29B in FIG. 29A.

Figure 30:
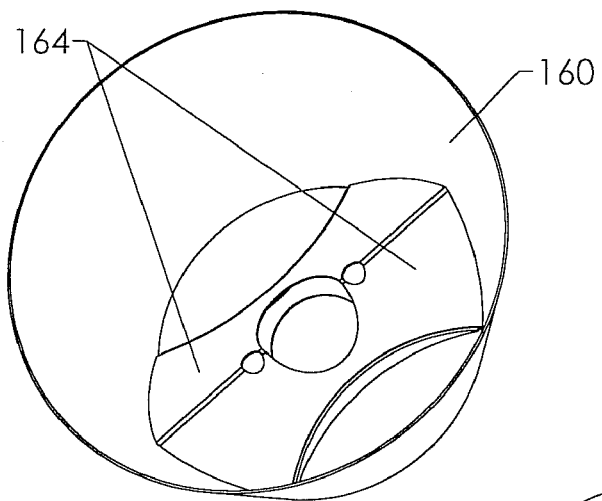

FIG. 30 is a top perspective view of the hopper unit of the nutcracker of FIGS. 12A-C.

Figure 31A:
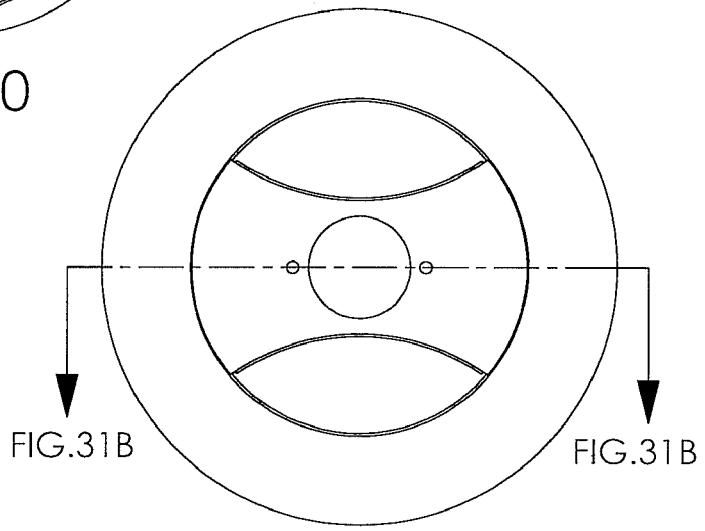

FIG. 31A is a bottom view of the hopper unit of FIG. 30.

Figure 31B:
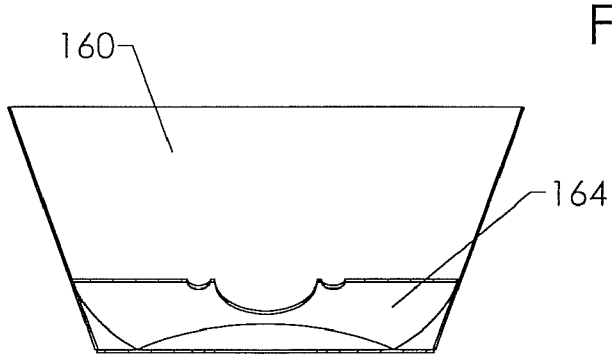

FIG. 31B is a cross-sectional view of the hopper unit of FIGS. 30 and 31A, viewed along the line 31B-31B in FIG. 31A.

Figure 32:
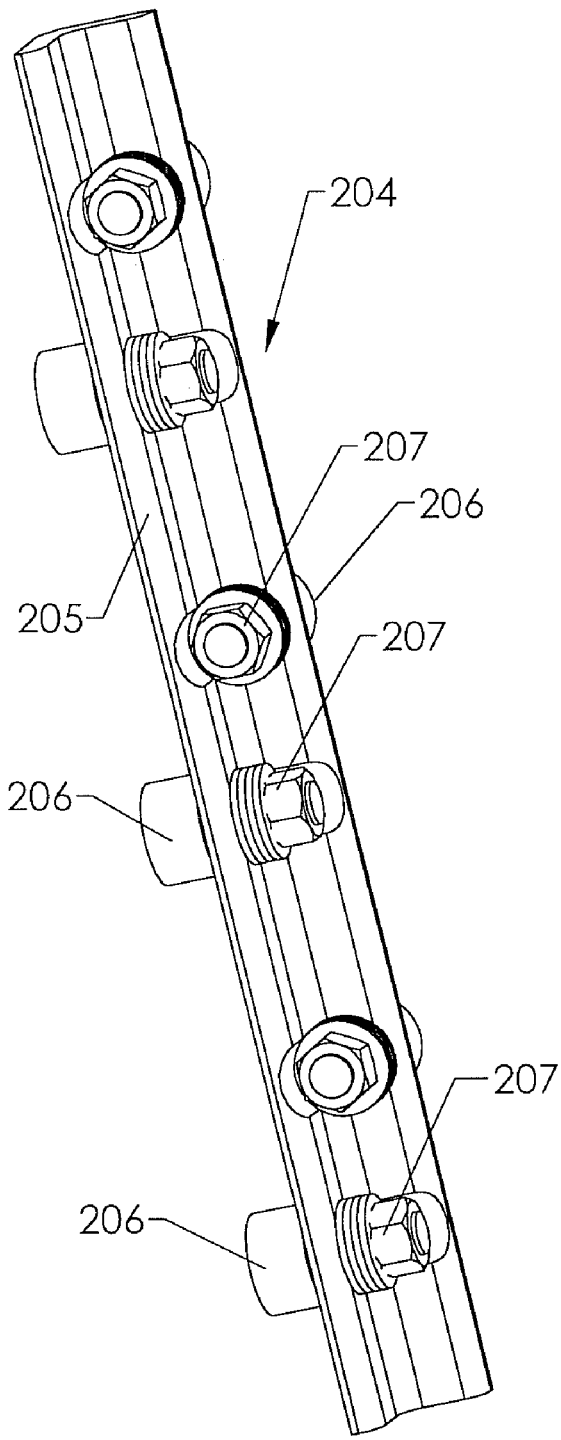

FIG. 32 is a perspective view of the roller rail of the nutcracker of FIGS. 12A-C.

Figure 33:
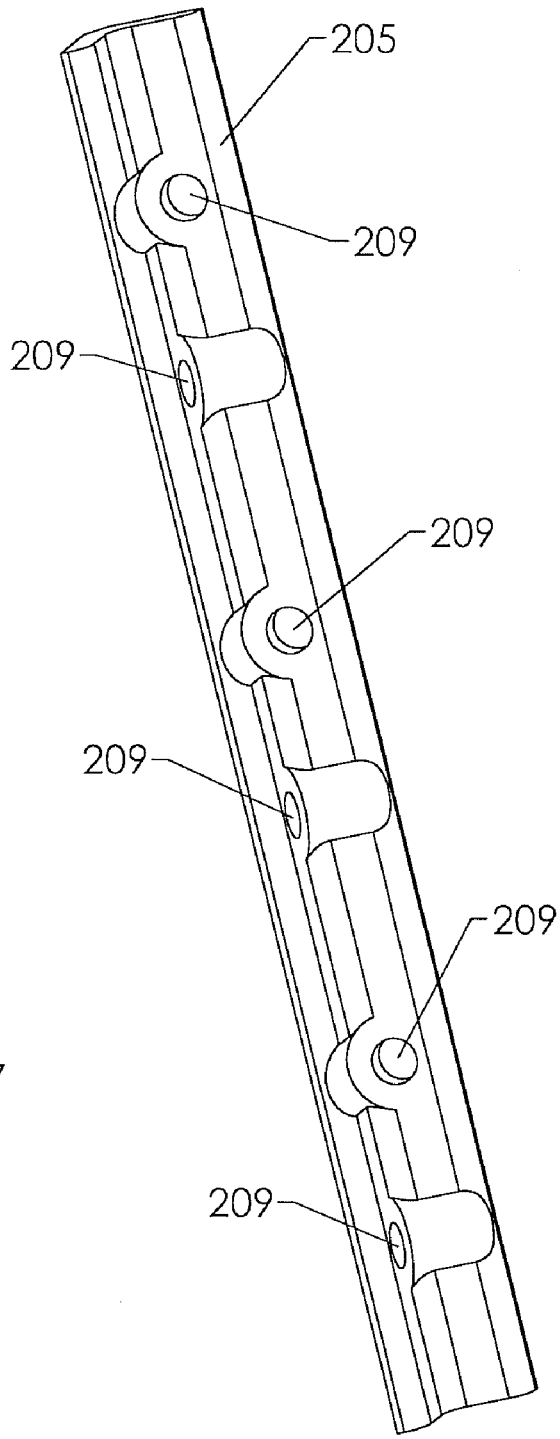

FIG. 33 is a perspective view of the rail of the roller rail of FIG. 32.

Figure 34:
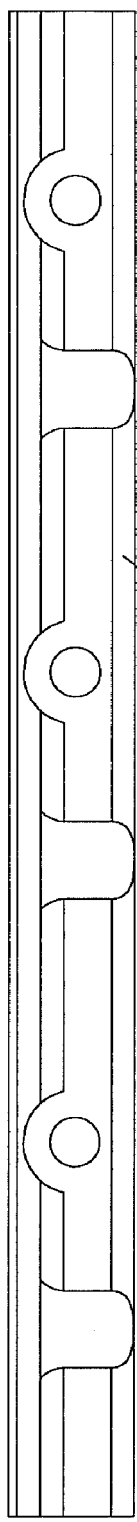

FIG. 34 is a side view of the rail of FIGS. 32 and 33.

Figure 35:
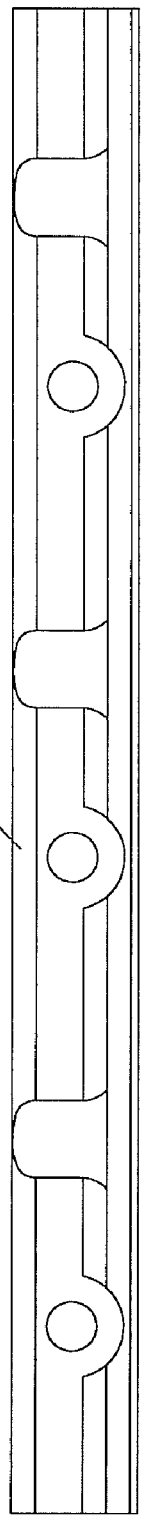

FIG. 35 illustrates the rail of FIGS. 32-34, viewed 90 degrees from the view of FIG. 34.

Figure 36:
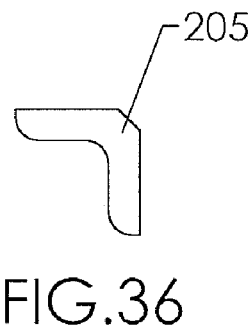

FIG. 36 is an end view of the rail of FIGS. 32-35.

DESCRIPTION OF THE PREFERRED EMBODIMENTS

Referring to the Figures, there are shown two, but not the only, embodiments of the invented nutcracker. FIGS. 1-11 portray a first embodiment of the nutcracker, which is a manually-powered nutcracker, but it will be understood that the nutcracker of FIGS. 1-11 is adaptable to be powered by a motor. FIGS. 12A-36 portray a second, especially-preferred embodiment that includes an adjustment system for changing the dimensions of the cracking zone by raising and lowering the preferred cylindrical barrel relative to the preferred conical unit. The embodiment of FIGS. 12A-36 comprises manual raising and lowering of the barrel, and motor-driven rotation of the conical unit relative to the barrel for nut-cracking, but it will be understood that this embodiment is adaptable to be motor-adjusted and/or manually-driven. The strong and stable adjustment system and engagement of the cylindrical barrel with the housing is particularly well-adapted for a motorized nut-cracking drive that has high staring torque and that is intended to crack large volumes of nuts over long periods of time.

Figure 1:
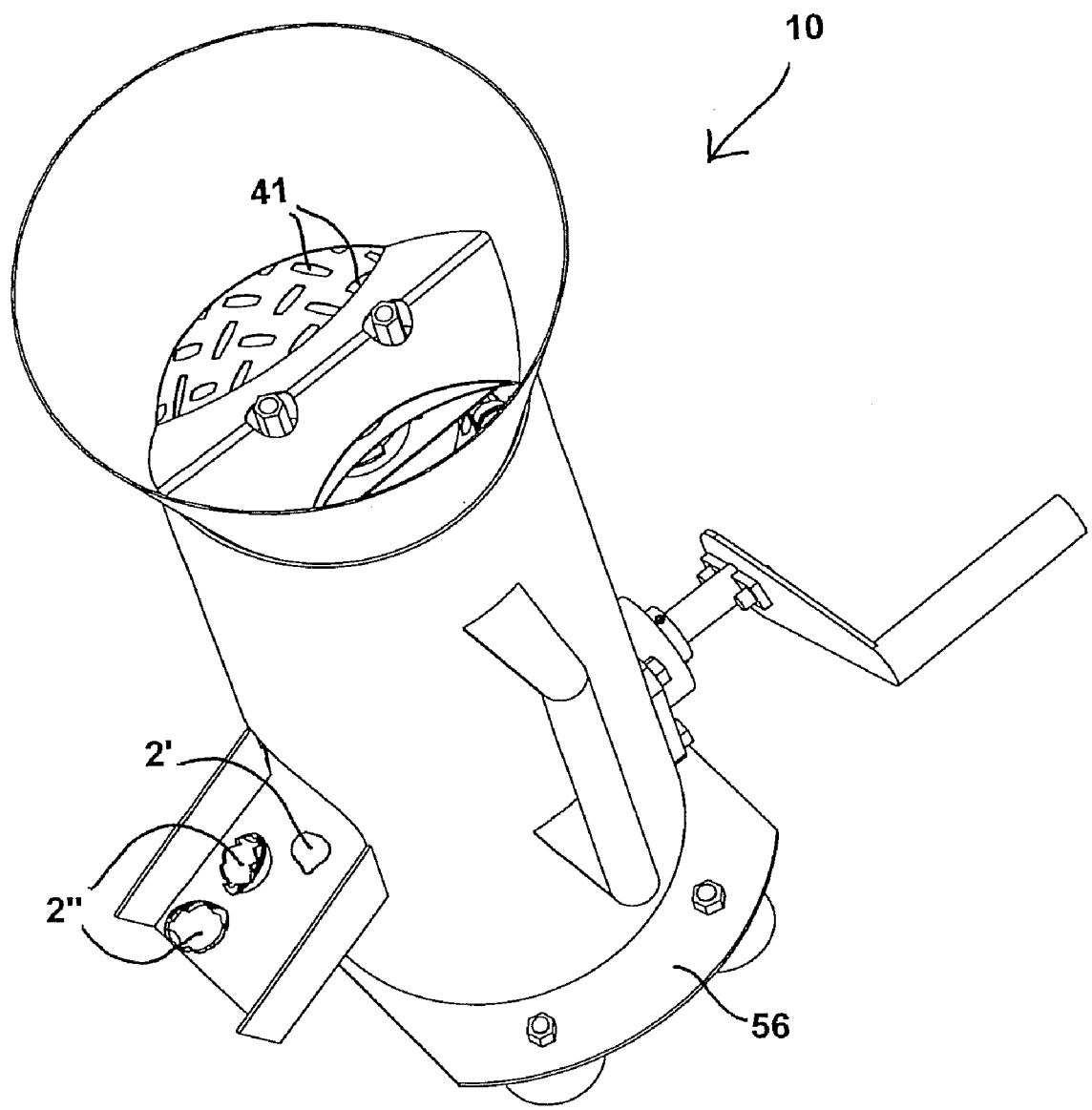
FIG. 1 is a top perspective view of one, but not the only, embodiment of the invented nutcracker, which is one embodiment of a manually-cranked nutcracker.
Figure 2:
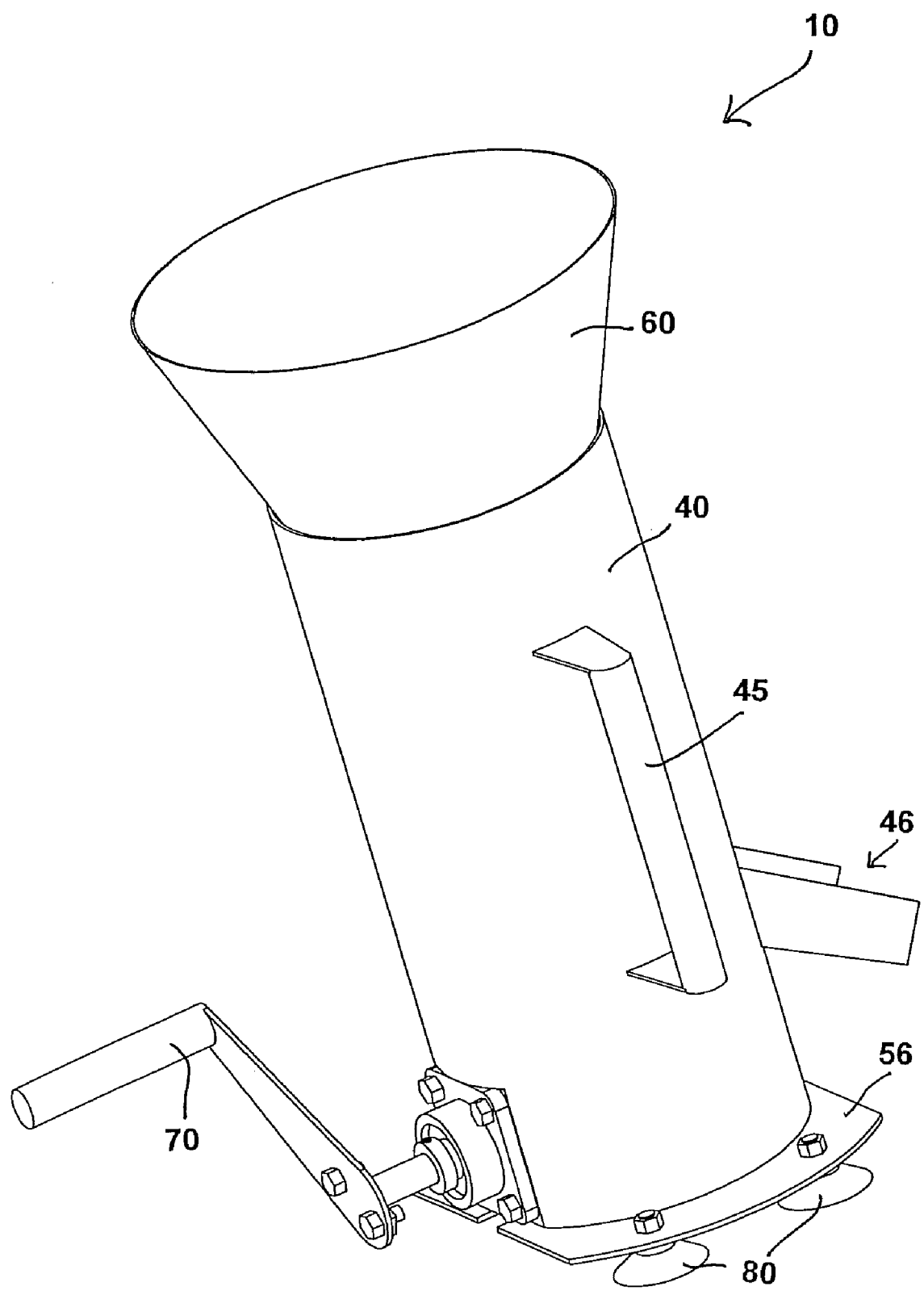
FIG. 2 is a side perspective view of the nutcracker of FIG. 1.
Figure 3:
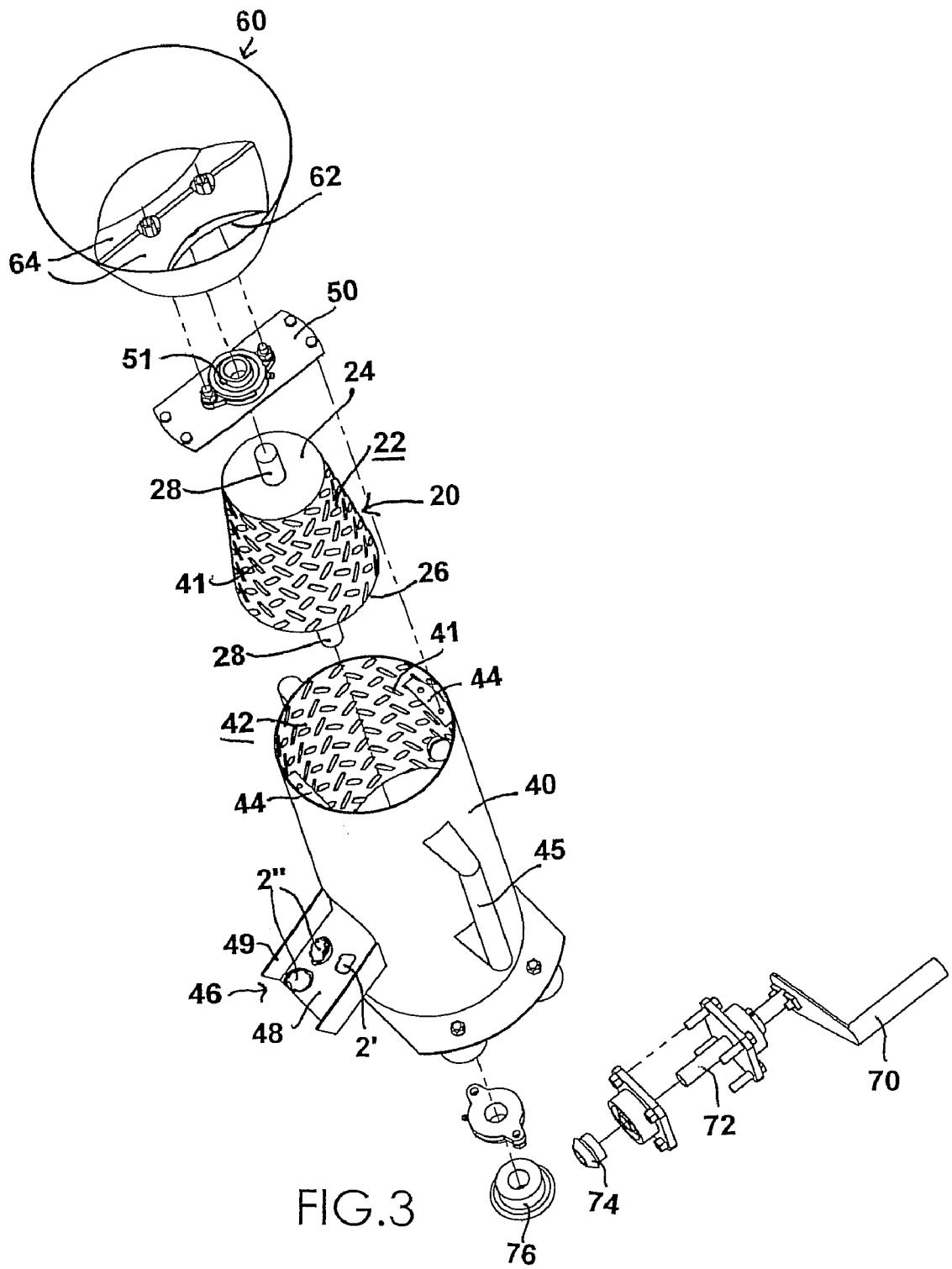
FIG. 3 is a top perspective, exploded view of the nutcracker of FIGS. 1-2.
Figure 4:
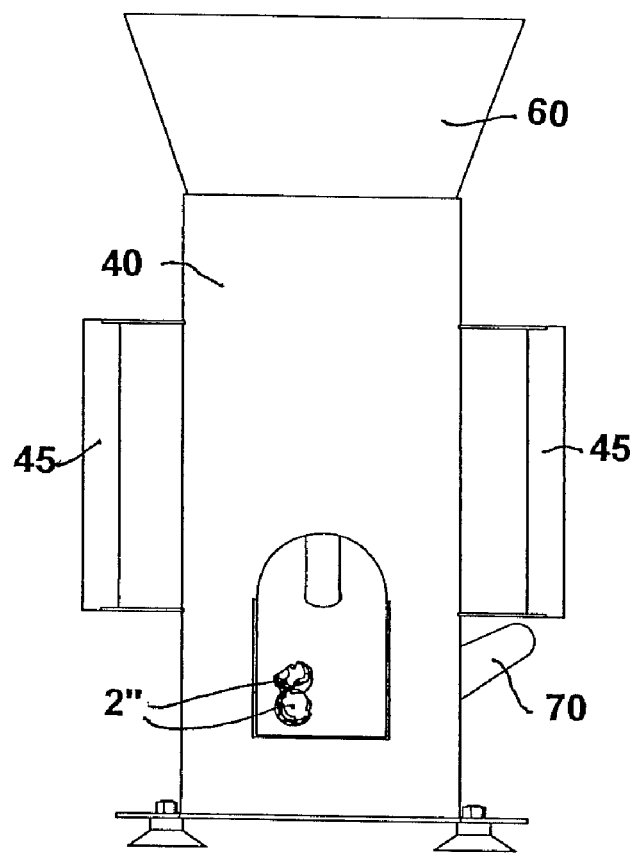
FIG. 4 is a front view of the nutcracker of FIGS. 1-3.
Figure 5:
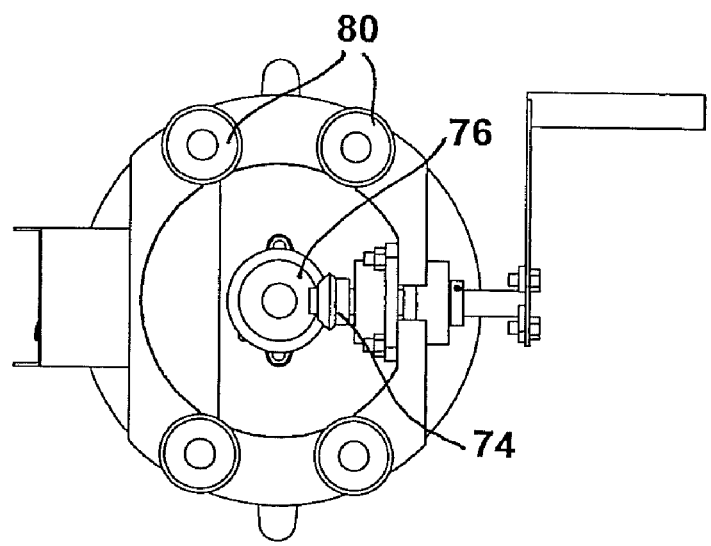
FIG. 5 is a bottom view of the nutcracker of FIGS. 1-4.
Figure 6:
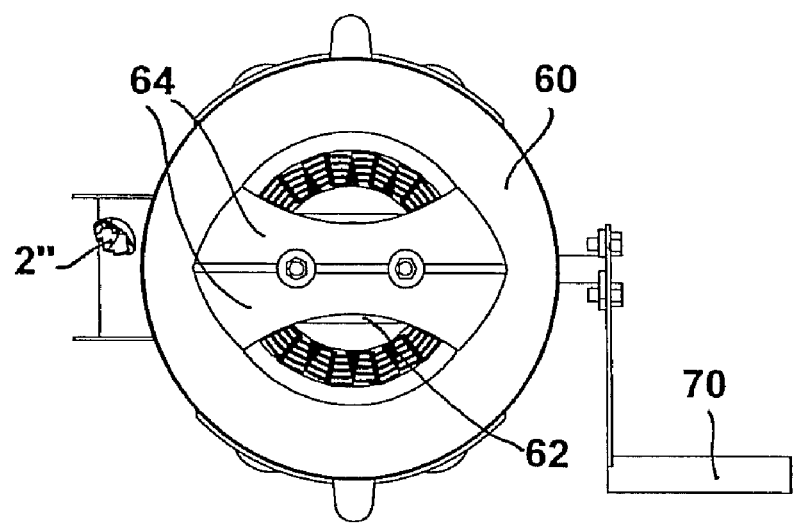
FIG. 6 is a top view of the nutcracker of FIGS. 1-5.
Figure 7:
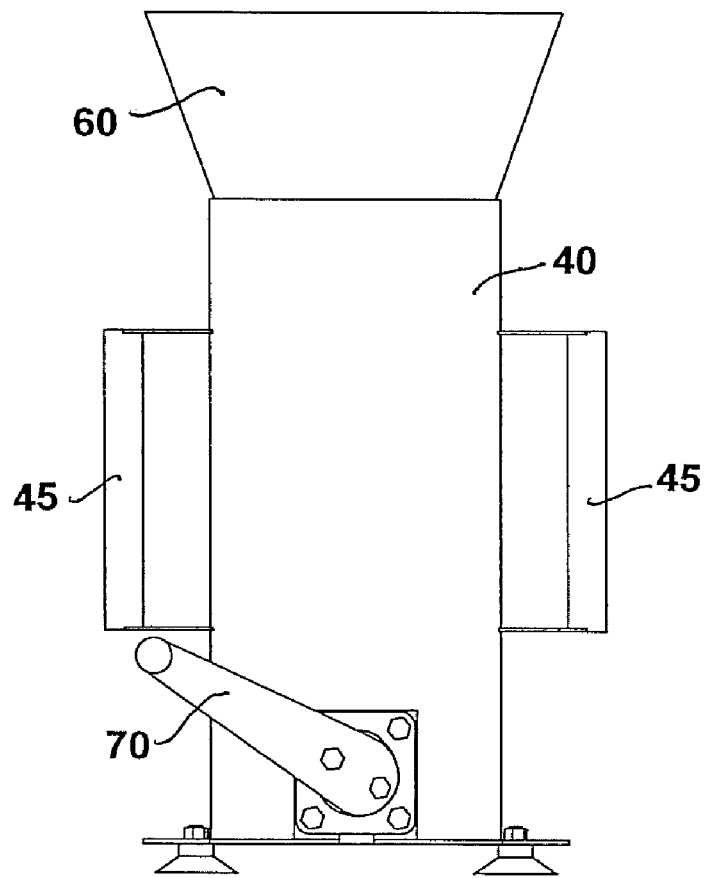
FIG. 7 is a rear view of the nutcracker of FIGS. 1-6.
Figure 8:
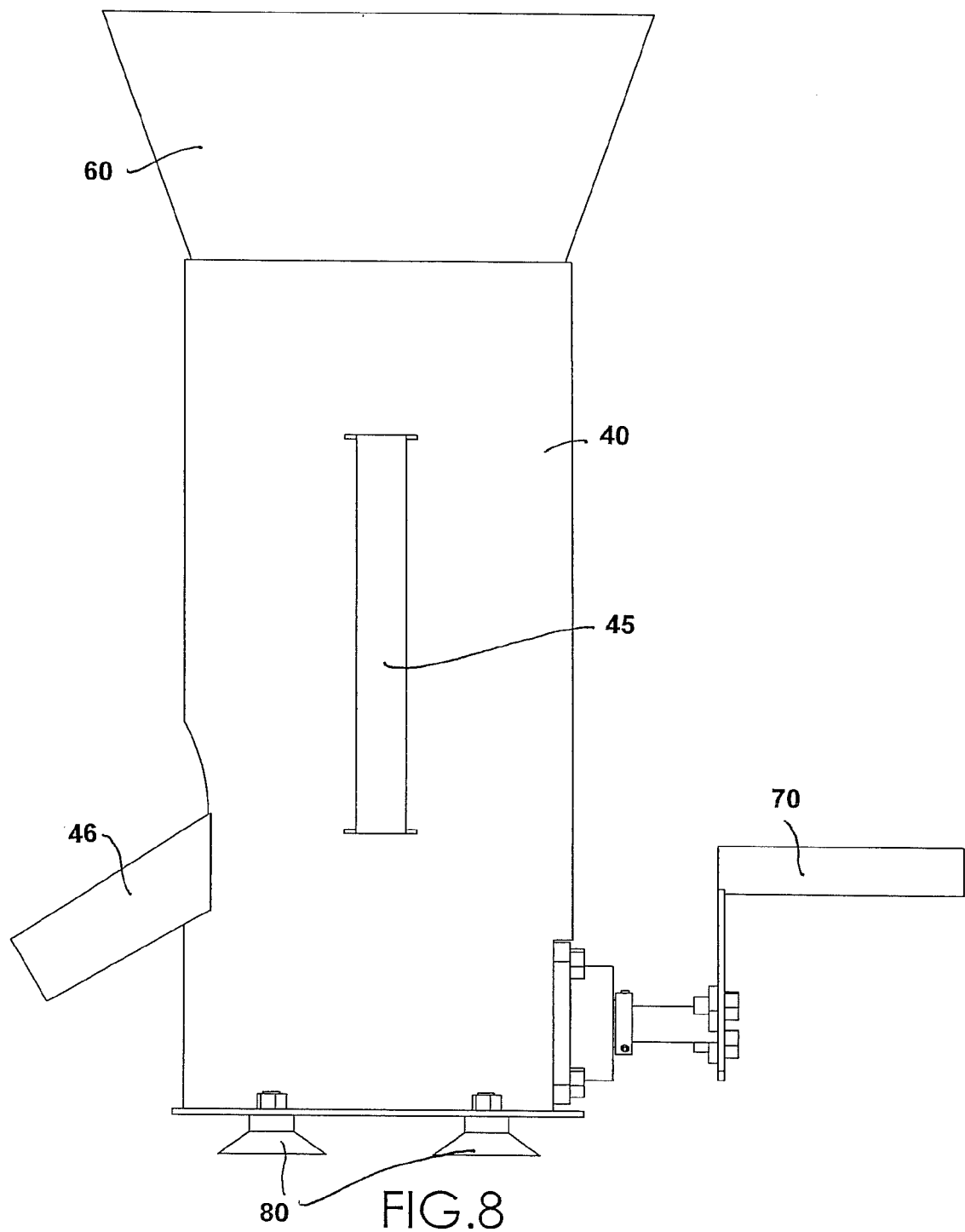
FIG. 8 is a side view of the nutcracker of FIGS. 1-7.
Figure 9:
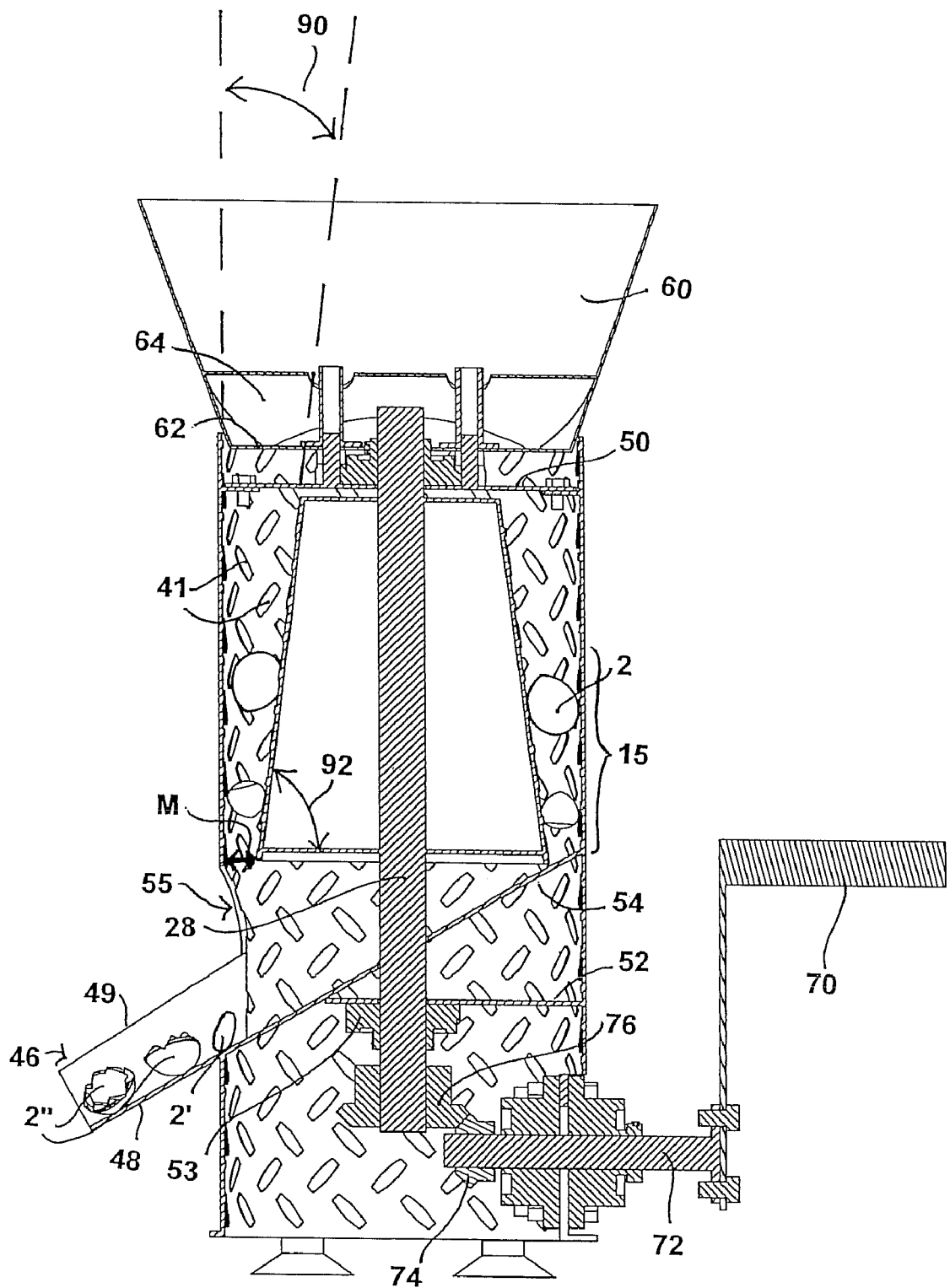
FIG. 9 is a cross-sectional side view of the nutcracker of FIGS. 1-8.
Figure 10:
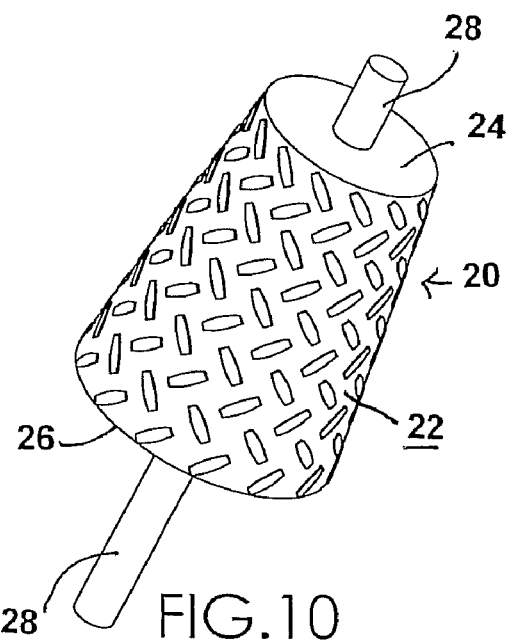
FIG. 10 shows the conical member and rod of the nutcracker of FIGS. 1-9.
Figure 11:
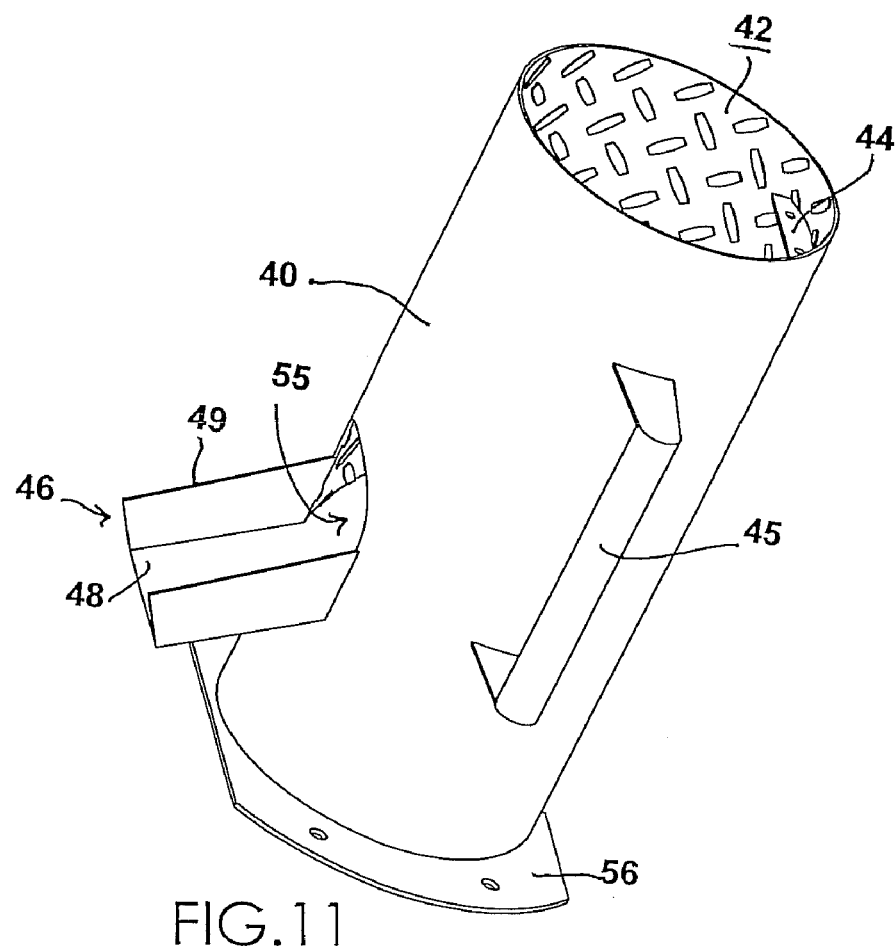
FIG. 11 shows the vertical cylinder, handles, and chute of the nutcracker of FIGS. 1-9.

The embodiment of FIG. 1-11 is a nutcracker 10 that cracks the shells of nuts 2 by utilizing gravity to roll the nuts 2 downward into an increasingly narrow cracking zone 15 between a vertical cylinder 40 and a conical member 20, as shown in FIG. 9. A description of the preferred embodiment of the invention follows.

The vertical cylinder 40 is the structural core of the nutcracker 10. An open cylindrical shape, with open circles at each end and walls extending perpendicularly to the planes of the circles, is preferred because of its ease of manufacture. The vertical cylinder 40 is preferably formed from a rectangular sheet of metal formed into a right, circular cylinder, and welded together at the ends that come together, and preferably has a diameter of eight inches. Tread plate is preferred for the sheet of metal because it is readily available and inexpensive in the welding industry, easy to form into the desired cylindrical shape, and has elongated, slanted protrusions. Its elongated protrusions 41 face inward, and are non-vertical and are non-horizontal, to form the preferred textured inner surface 42 of the vertical cylinder. In use, the protrusions 41 are preferably slanted at 40-50 degrees, and more preferably at 45 degrees, relative to vertical. This way, nuts falling onto a given protrusion will tend to slide downward between adjacent slanted protrusions, and, as described elsewhere in this disclosure, fall by gravity until they become trapped in the cracking zone of narrowing width, to be shelled by the force/pressure of the rotating cone and the stationary cylinder.

Protrusions 41 preferably extend no more than one-eighth of an inch from the surrounding plate surface and are at right angles to each other so that they are "woven" into a pattern at regular intervals as shown in FIGS. 1, 3, 9, 10, and 11, allow the vertical cylinder to grip the nuts 2 to be cracked. It is envisioned that tread plate with textures other than that shown, or rigidized metal or dimpled metal, could be used as alternatives to the illustrated tread plate. The sheet of metal may be made of any kind of steel; however, stainless steel is preferred because it is the most sanitary material and easily washed. Aluminum, on the other hand, would wear down after repeated use and is therefore not desired.

The vertical cylinder 40 preferably has handles 45 welded onto each side of the vertical cylinder 40, which allow the nutcracker 10 to be carried, and to be controlled once the nutcracker 10 is placed on the work surface. Welded onto the bottom of the vertical cylinder 40 will preferably be a bottom plate 56, which prevents the vertical cylinder 40 from digging into the work surface. Four eight-pound manual release suction cups 80, each two inches in diameter, are preferably bolted onto the bottom plate 56, to prevent the nutcracker 10 from moving once it has been placed on the work surface; push-button suction cups could also be used. However, the nutcracker 10 could also be clamped onto the work surface, or even bolted or otherwise fixed to the work surface.

A first cross-arm bearing support 50 will preferably be attached at or near the top or the vertical cylinder 40; it is envisioned that the first cross-arm bearing support 50 could either be welded onto the vertical cylinder 40 directly, or fastened onto landings 44 which are welded onto the vertical cylinder 40. The first cross-arm bearing support will preferably have a one-inch first bearing 51 attached to it which is configured to receive a rod 28 and allow the rod 28 to spin in the center of the vertical cylinder 40. The first cross-arm bearing support 50 will preferably also have smaller holes which are configured to receive bolts for the purpose of attaching a hopper 60 to the vertical cylinder 40.

The hopper 60 is preferably an inverted partial cone, and serves as a funnel to allow more nuts 2 to be placed into the nutcracker 10. By "inverted", it is meant that the open-ended truncated cone is oriented with its larger-diameter open end upward and its smaller-diameter open end downward. The hopper 60 is preferably manufactured as a separate piece from the vertical cylinder 40. The hopper 60 is preferably made of sixteen-gauge sheet metal. The hopper 60 preferably has a horizontal plate 62 with small holes adapted to receive bolts, as well as a pair of slanted plates 64 with apertures adapted to receive bolts, all three plates being welded onto the hopper 60. Means other than bolts to fasten the hopper 60 to the vertical cylinder 40 are envisioned. The slanted plates 64 are positioned at or near the center of the hopper, and slanted downward toward the wall of the hopper, to allow the nuts 2 to fall down, around the conical member 20, into the vertical cylinder 40. The configuration of horizontal plate 62 and slanted plates 64 have the purposes of securing the hopper 60 to the vertical cylinder 40, and preventing hands from going into the vertical cylinder 40 and becoming injured. When the hopper 60 is placed onto the vertical cylinder 40, the hopper 60 and vertical cylinder 40 preferably form an angle of approximately 150-170 degrees, and most preferably 161 degrees.

Nutcracker 10 comprises a plate system that provides effective mounting and operation of the conical member 20 rotating shaft (rod 28) and its bearings, and yet provides a slanted surface(s) that receive(s) cracked nuts and their shells and directs them out of the device into a slanted spout. As shown in FIG. 9, a first plate 54 is preferably attached to the entire interior perimeter of the vertical cylinder 40. The first plate 54 preferably is made of sheet metal and has a smooth top surface, has a hole in its center that is adapted to allow a rod 28 to pass through and spin, and is slanted from the horizontal to allow shelled nuts 2 (comprising nut meat 2' and shells 2") to slide down along the first plate 54 and out of the vertical cylinder 40 through an opening 55 in the vertical cylinder 40, preferably exiting the vertical cylinder 40 along a spout 46.

The spout 46 is preferably made from the same piece of sheet metal as the first plate 54, and preferably has a bottom portion 48 that is parallel to the first plate 54, and two side portions 49 which serve to guide the nuts 2 in a uniform direction as they exit the nutcracker 10.

A second plate 52 is preferably attached to the vertical cylinder 40 and to the bottom of the first plate 54, and has a one-inch second bearing 53 configured to receive rod 28 and allow rod 28 to spin. Below the second plate 52 is a bevel gear comprising a first bevel wheel 74 and a second bevel wheel 76. The first bevel wheel 74 is keyed to hold the rod 28 in place, the rod 28 also being keyed at its bottom end. The second bevel wheel 76 meshes with the first bevel wheel 74. The second bevel wheel 76 is attached to a shaft 72 and crank 70, which allow the user to turn the rod 28 within the vertical cylinder 40, causing the conical member 20 to rotate. It is envisioned that there are other ways to turn the rod 28 and conical member 20, such as with a motor with two sprockets and a chain, or by using a rod 28 long enough to extend beyond the hopper 60 and connected to a crank to the top end of the rod 28.

The second essential element of the nutcracker 10 besides the vertical cylinder 40 is the conical member 20. The conical member 20 is centered in the vertical cylinder 40. The preferred conical member 20 preferably has a broad end 26 with diameter of seven inches, a narrow end 24 with diameter of four-and-one-half inches, and a height of eight inches. The conical member 20 is preferably hollow. In the same or similar way as the cylinder 40, conical member 20 preferably comprises elongated, slanted protrusions facing outward to form a textured exterior surface 22. As for the vertical cylinder 40, the protrusions of the in-use conical member 20 are preferably non-vertical, non-horizontal, and preferably angled at 40-50 degrees (most preferably 45 degrees) from vertical. For manufacture of the conical member 20, a tread plate, of the same material and design as the plate for cylinder 40, may be cut with two arcs of different radii centered upon the same point and then curled/bent to form a cone shape. A sheet of metal, preferably also tread plate, is also used to close the narrow end 24 of the conical member 20 and the broad end 26 of the conical member 20. If tread plate is used to close the narrow end 24 and the broad end 26, the treads preferably will be positioned to face inward so that the exterior portions of the narrow end 24 and broad end 26 are smooth.

A single rod 28 preferably extends through and is welded into the center of the narrow end 24 and the broad end 26. The rod 28 preferably has a diameter of one inch. However, two separate rods could also be used, with one extending from the narrow end 24 and the other extending from the broad end 26, and still achieve the purposes of the conical member 20. The angle 92 between the textured exterior surface 22 and the broad end 26 is preferably between 80 and 84 degrees, and most preferably 82 degrees.

The area between the textured exterior surface 22 and the textured interior surface 42 forms a cracking zone 15. The textured interior surface 42, which is the inner surface of the vertical cylinder, is vertical in the cracking zone 15, as the textured interior surface 42 is preferably vertical at all points. The textured interior surface 42 is continuous from the top of the vertical cylinder 40 though the cracking zone 15 to the bottom of the vertical cylinder 40 because the preferred vertical cylinder 40, of which the textured interior surface 42 is a part, is inexpensively made from a single rectangular piece of sheet metal, preferably tread plate, bent into a right cylinder and welded together.

The textured exterior surface 22, which is the exterior surface of the conical member 20, is also continuous from the narrow end 24 of the conical member 20 through the cracking zone 15, and to the broad end 26 of the conical member 20, because the preferred textured exterior surface 22 is also made from a single piece of sheet metal, preferably tread plate.

An angle 90 between the textured exterior surface 22 of the conical member 20 and the textured interior surface 42 of the vertical cylinder 40 causes the cracking zone 15 width (distance, gap width) between the textured exterior surface 22 and textured interior surface 42 to decrease as the nuts 2 are pulled downward by gravity. As the conical member 20 spills within the vertical cylinder 40, or alternatively, as the conical member 20 is alternately spun in one direction and then the other, gravity causes the nuts 2 to roll downward in the cracking zone 15. The cracking zone 15 width decreases in the downward direction, resulting in increasing pressure applied to the nuts 2 as they are squeezed between the textured exterior surface 22 and textured interior surface 42.

If either the textured exterior surface 22 or the textured interior surface 42 were smooth, then the nuts 2 would slip and move upward, or stay at one level in the nutcracker, never breaking or cracking. This is why tread plate is preferably used to grip the nuts—its elongated protrusions 41 which protrude no more than one-eighth of an inch and are at right angles to each other woven into a pattern at regular intervals, cause consistent gripping and cracking of the nuts because of the even distribution of pressure, but not tearing into the shells and creating small pieces which must be cleaned.

If the angle 90 were too great, then the nuts 2 would also slip and move upward, never breaking or cracking. However, if the angle 90 were two small, then the nuts 2 would be crushed and broken repeatedly due to pressure applied over a greater distance (in an axially-long, narrow gap between the vertical cylinder and the conical member), causing them to break into many small pieces. The inventor has found that an angle 90 between six and fourteen degrees, more preferably 6-10 degrees, and most preferably 8-10 degrees, and a minimum cracking zone width M between the bottom part of the textured exterior surface 22 and textured interior surface 42 of three-eighths of an inch to five-eighths of an inch, and preferably seven-sixteenths to one-half of an inch, allows the nutcracker 10 to crack substantially any type of nuts 2 except peanuts.

Thus, it may be seen that the cracking zone is formed by non-parallel cracking surfaces (vertical cylinder inner surface and a conical member outer surface) that are preferably not parallel at any location, and particularly not parallel at any region of the cracking zone. Also, the slanted protrusions of both of said cylinder and conical member encourage each type, size and shape of nut to fall/slide down to a respective region of the cracking zone wherein that type/size/shape of nut becomes trapped and cracked between the non-parallel cracking surfaces. There are, therefore, many different regions (of different widths) in the cracking zone, and nuts 2 of many different types, sizes, and shapes are effectively cracked in the nutcracker 10 without adjustments or modifications of the cylinder, cone, or their relative positions.

When the nuts 2 are poured between the vertical cylinder 40 and the conical member 20, and the conical member is rotated, the nuts 2 move downward, the shells of the nuts crack, and the nuts break into halves and thirds, fall onto the first plate 54, and slide out of the nutcracker 10 along the spout 46, as shown in FIG. 9. Walnuts begin cracking when they are about half-way down from the top of the conical member 20, and are usually cracked by the time they are two inches down from this half-way point. It has been found that 216 pounds of walnuts per hour, or one bushel of walnuts every ten minutes, can be cracked by hand using the embodiment portrayed as nutcracker 10.

An especially-preferred embodiment, nutcracker 110, is portrayed in FIGS. 12A-36. Nutcracker 110 utilizes a right cylinder and cone combination, similar to that in nutcracker 10, which provide non-parallel cracking surfaces and preferably slanted protrusions; hence, nutcracker 110 has the versatility described for nutcracker 10 in cracking many different types, sizes, and shapes of nuts. In addition, however, to even further increase versatility to a wider range of nuts, nutcracker 110 comprises an adjustment system that may be used to raise or lower the position of the vertical cylinder relative to the cone, to change the maximum and minimum width of the cracking zone (the distance between the inner surface of the vertical cylinder and the outer surface of the cone).

Referring to FIGS. 12A-36, the parts/features of nutcracker 110 that are similar to parts/features in nutcracker 10, are given call-out numbers that are the same as in nutcracker 10 plus "100"; thus, hopper 160 in nutcracker 110 corresponds, or is similar, to hopper 60 in nutcracker 10. Parts/features called-out in nutcracker 110 that do not have corresponding/similar parts in nutcracker 10 typically have numbers in the "200 series" rather than the "100 series".

The fully-assembled, preferred nutcracker 110 is portrayed to best advantage in FIGS. 12A and B, and 22, and 23B and C. FIGS. 12A and B and 23B and C portray the barrel 230 raised relative to the conical member 120, whereas FIG. 22 portrays the barrel 230 lowered relative to the conical member 120. The nutcracker 110, with various parts removed, is shown in FIGS. 12C and 13-15. The housing 202 is shown to best advantage in FIGS. 16 and 17. The barrel 230 and conical unit 120 are shown together, to best advantage, in FIGS. 18A and B and 19. The roller frame of the barrel 230 is shown to best advantage in FIG. 20. Operation of the preferred lead-screw-style adjustment system is shown to best advantage by comparing FIGS. 22 and 23C. FIGS. 21-23C provide top and bottom views and cross-sectional view of the nutcracker 110, and FIGS. 24-36 provide details of many preferred pieces-parts of nutcracker 110.

Nutcracker 110 comprises a base 201, a housing 202, a barrel 230 adjustably received in the housing 202, and a conical unit 120 mounted inside the housing and concentrically received in and rotatable inside the barrel 230. A power unit 170, such as an electric motor and controls, are attached to the base 201 and housing 202, and operatively connected to a shaft 172 that causes rotation of the conical unit 120 (via multiple bearings, wheels, and/or gears as will be understood by one of skill in the art after viewing the drawings and after reading the description of nutcracker 10).

Base 201 comprises a bottom plate 156, multiple suction cups 180, and a plate system that comprises both horizontal plate 152 and slanted plate 154 (as best shown in FIGS. 22 and 27). This plate system provides for effective mounting and operation of the conical member rotating shaft and its bearings, via horizontal plate 152, and yet provides a slanted surface(s), via slanted plate 154, that receive(s) cracked nuts and their shells and directs them out of the device in a slanted shoot or spout 146.

As shown to best advantage in FIGS. 16 and 17, housing 202 comprises handles 145, multiple generally horizontal rings (top ring 208, bottom ring 210, and middle ring 212), multiple inner housing wall segments 214, and outer wall 250. Segments 214 serve to further reinforce the housing 202 and to block nuts and shells from flying into, and becoming lodged in, the housing so that they proper exit the nutcracker 110.

Connected to the rings 208, 210, and 212 are vertical, preferably L-shaped or V-shaped, rails 220, each of which features a generally L- or V-shaped surface facing inward (toward the central axis of the device) from multiple locations spaced around the housing 202. These rails 220 engage and cooperate with an equal number of roller-rails 204 of the roller frame of barrel 230 (see FIG. 20), as will be further described below, to allow the barrel 230 to be raised and lowered relative to the conical unit 120. Alternatively, other vertical channels or grooves may be provided in the housing to cooperate with the roller frame of the barrel 230. Alternatively, rollers may be provided in, and connected to, the housing, wherein the housing rollers roll along rails, channels or grooves in an outer surface of the barrel as the barrel is lifted or lowered.

Conical unit 120 is centrally located and rotatably mounted in the nutcracker 110, and preferably does not move upward or downward, but rather only rotates on its axis, provided by rod 128. The conical unit comprises a right cone that is preferably truncated to provide improved mounting of the rod 128 in the nutcracker and improved cooperation with the hopper. The preferred cone of conical unit 120 extends along approximately ½ of the height of the nutcracker 110. The angle between the right cylinder 140 inner surface and the surface of the cone of conical unit 120 (previously portrayed as an angle 90 in nutcracker 10, and portrayed as angle 190 in FIG. 22) is preferably between six and fourteen degrees, preferably 6-10 degrees, and most preferably eight-ten degrees. In a similar manner as discussed for nutcracker 10, angle 190 is important (should not be too large) for encouraging nuts to fall until they are captured between the cylinder and cone, rather than to "pop" and jump upwards between the cylinder and cone. Also, the angle 190 is important (should not be too small) for preventing nuts from being trapped too early and in too small a gap over a long distance down the cracking zone, as such a process may continue to grind and crack the nuts into small pieces instead of producing substantially whole shelled nuts (for example, frequently halves or thirds, but not fragments or shards).

Barrel 230 comprises vertical cylinder 140, which has an inner surface that is preferably exactly a right, circular cylinder, a hopper 160 mounted at or near the top of the barrel 230, and a roller frame connected to the outside of the cylinder 140 that cooperates with vertical rails 220 in the housing 202 to allow the barrel 230 to be raised and lowered inside the housing. The roller frame, shown to best advantage in FIG. 20, surrounds and is attached to the sidewall of the vertical cylinder 140, for guiding, reinforcing, and stabilizing the barrel as the roll frame engages the rails of the housing, and for enabling engagement of the barrel by an adjustment mechanism to raise and lower the barrel. The roller frame comprises multiple generally horizontal frame rings (preferably top frame ring 258, bottom frame ring 260, and middle frame ring 262). Fixed to rings 258, 260, and 262 are multiple vertical roller-rails 204. Each roller rail 204 comprises a rail 205 that is preferably L-shaped or V-shaped, and multiple rollers 206 mounted at spaced locations along the length (height) of each rail 205. Each roller 206 may be mounted, for example, by a roller shaft extending through the rail 205 and fastened by a nut 207 or other fastener. The nuts 207 shown in the figures are adjacent multiple optional washers. The shape and size of each rail 205, and its protruding rollers 206, are adapted to mate or otherwise engage, the L- or V-shaped surface of the vertical rails 220 that faces the rollers 206, so that the rollers may roll up and down inside the housing. The rollers 206 are provided on two surfaces of each rail 205, so that they protrude at generally 90 degrees relative to each other to engage the generally 90 degree arms of vertical rails 220.

With the barrel 230 received inside the housing 202 so that rollers 206 engage vertical rails 220, the barrel 230 is preferably centered inside the housing and centered around the conical unit 120. The inner surface of the vertical cylinder 140 and the outer surface of the cone (of unit 120) are non-parallel cracking surfaces that form a cracking zone 115, in a similar manner as discussed above for nutcracker 10. The width of the cracking zone (distance between the cracking surfaces) becomes narrower lower in the nutcracker. The cylindrical surface is preferably a vertical, right cylindrical surface, and the conical surface is preferably the outer surface of a right circular cone, and so the narrowing of the cracking zone becomes linearly narrower the lower a nut travels in the cracking zone.

In order to further increase the types, sizes, and shapes of nuts that can be cracked by nutcracker 110, the barrel 230 is preferably adjustable up and down in the housing, and, hence, up and down relative to the conical unit 120. One or more adjustment systems may be provided, with said adjustment systems preferably, but not necessarily, including a manual actuation system that lift and lowers the barrel and locks the barrel in selected levels relative to the housing. For example, as shown to best advantage by comparing FIG. 22 and FIG. 23C, lead screw assembly 251 may be used to raise and lower the barrel 230. Assembly 251 comprises head/knob 252, which is grasped and turned (for example, with a hand tool) to rotate lead screw 253. As lead screw 253 is rotated on its axis, lead screw 253 moves vertically relative to anchor nut 254, due to its threaded engagement with anchor nut 254 and the connection/securement of anchor nut 254 to the top ring 208 of housing 202. The barrel 230 may be raised by turning knob 252 to rotate the lead screw 253 in a direction that forces it to rise in anchor nut 254, because, as lead screw 253 moves upward it carries with it barrel 230 by means of its connection (via block 255) to top frame ring 258 of the roller flame of barrel 230. Thus, by manually turning the lead screw 253 in one direction, the barrel 230 moves upward, and by manually turning the lead screw 253 in the opposite direction, the barrel 230 moves downward. Optionally, another similar lead screw assembly may be provided on an opposite side of the nutcracker 110, to better stabilize and maneuver the barrel adjustment. Alternatively, other raising and lowering mechanisms may be used.

Given that many rollers (preferably more than 20) are provided along the length (height) of multiple (preferably four) rails to engage and roll along vertical rails on the housing, and given that most of these rollers stay in contact with the housing even when the barrel 230 is raised, the barrel-housing connection and engagement remains stable and non-wobbling. One may note from FIG. 23B, that, even when the barrel 230 is raised, ⅔ of the rollers 206 stay in contact with vertical rails 220. This is because, when the barrel 230 is fully raised, the middle and lower pairs of rollers (all around the barrel, so totaling 16 rollers) remain inside the housing and only the top pairs of rollers (all around the barrel, so totaling 8 rollers) are above the housing. It is preferred that ½-⅔ of the rollers remain in the housing when the barrel 230 is fully-raised, and, therefore, that ½-⅓ of the rollers are above, and outside of, the housing. While the rollers act as wheels/casters to allow adjustment of the cylinder, they act as spacers and stabilizers between the housing and the barrel during use of the nutcracker 110.

When the preferred barrel 230 is in the fully-lowered position, as in FIG. 22, the horizontal gap between the bottom of the cylinder 140 and the bottom of the cone (120), which determines the minimum cracking zone width M in the fully-lowered preferred embodiment, is preferably in the range of 0.2-0.3 inches (5.1-7.6 mm), and more preferably 0.24-0.26 inches (6.1-6.6 nun), and most preferably 0.25 inches (6.4 mm). One may see that this is smaller than the minimum cracking zone described for nutcracker 10. The bottom of the cylinder 140 and the cone (120) are generally level with each other, and both approximately 1 inch (25.4 mm), above the horizontal level of the bottom ring 210 of the housing, as shown by R in FIG. 22.

When preferred barrel 230 is in the fully-raised position, as in FIG. 23B and C, the horizontal gap between the bottom of the cylinder 140 and the cone surface (of unit 120) is determined by the bottom edge of the cylinder being horizontally (radially) spaced from the cone surface at a location (a circumference) much higher up on the cone. In this configuration, upon passing the bottom edge of the cylinder 140, the nuts and shells will be falling into and through a space below the cracking zone, to be caught by the slanted ring 224 (see FIGS. 17 and 23C). Slanted ring 224 is provided in the housing to direct nuts and shells toward slanted plate 154. Note that the slanted ring is shaped and positioned in the housing so that its inner-diameter edge is directly below the vertical cylinder and so that the ring 224 slants upward and outward to place its outer-diameter edge at a location (higher than its inner-diameter edge) that is radially outward from the vertical cylinder and at a horizontal level generally at the same level as the bottom edge of the cone.

The horizontal gap (minimum cracking zone width M) in this fully-raised configuration is preferably 1-1.25 inch (25.4-31.8 mm), more preferably 1.1-1.2 inch (27.9-30.5 mm), and most preferably 1.12 inch (28.4 mm). One may see that this is larger than the minimum cracking zone described for nutcracker 10.

Thus, nutcracker 110 is adjustable to have a minimum cracking zone M anywhere in the range of about 0.2-1.25 inches (5.1-31.8 mm), resulting in a very flexible nutcracker for cracking many different types and sized of nuts. In the fully-raised configuration, the bottom of the cone (of unit 120) is still approximately 1 inch (25.4 mm) above the horizontal level of the bottom ring 210, because it is not adjusted up or down relative to the housing, but the bottom edge of the barrel is located generally midway along the cone length (height) and several inches above the horizontal level of the bottom ring 210.

The barrel is preferably continuously adjustable to any position between said fully-lowered and said fully-raised position, for a large amount of flexibility in cracking many different kinds and sizes of nuts. It is preferred that the conical unit 120 does not move except by rotation, and movement of the barrel only is relied upon for adjustment of the relative position of, and distance between, the cylindrical cracking surface and the conical cracking surface.

As will be understood from the discussion of the protrusions on the inner cylindrical surface and outer conical surface of the cylinder and cone of nutcracker 10, the cylinder 140 and conical member 120 of nutcracker 110 also have protrusions that protrude a small distance into the annular space between said cylinder and cone. The protrusions are preferably elongated and slanted, for example, at 40-50 degrees relative to vertical and preferably 45 degrees relative to vertical and horizontal. The protrusions may each be a bar-like shape, preferably with rounded ends, so that the nuts slide down and spiral around the annular space to be captures in the appropriate region of the cracking zone. As in nutcracker 10, the protrusions on the cracking surfaces of nutcracker 110 may be provided by tread plate.

Although this invention has been described above with reference to particular means, materials and embodiments, it is to be understood that the invention is not limited to these disclosed particulars, but extends instead to all equivalents within the scope of the following claims.

I claim:

1. A nutcracker comprising:
    a vertical, right cylinder with a textured interior surface having a length between a top end and a bottom end of said interior surface;
    a right circular cone with a textured exterior surface having a length between a top end and a bottom end of the exterior surface;
    wherein the cone is rotatably mounted within the vertical cylinder with a narrow end of the cone facing up and a broad end of the cone facing down;
    wherein said interior surface and said exterior surface are non-parallel all along the length of the interior surface and all along the length of the exterior surface to form an annular space between said interior surface and said exterior surface that linearly decreases in width from top to bottom of the annular space so that the annular space comprises a cracking zone around a lower portion of the interior surface of the cylinder, said cracking zone having a minimum width between the bottom end of the interior surface of the cylinder and the exterior surface of the cone, so that nuts received in the annular space fall down to be cracked in the cracking zone between the non-parallel interior and exterior surfaces;
    wherein the cylinder is adjustable in position relative to the cone between a fully-lowered position wherein the bottom end of the interior surface of the cylinder and the bottom end of the exterior surface of the cone are at substantially the same level, to a fully-raised position wherein the bottom end of the interior surface of the cylinder is located about midway along the length of the exterior surface of the cone, so that said minimum width of the cracking zone is larger when the cylinder is in the fully-raised position than when in the fully-lowered position, for preventing nuts from being ground and cracked into small pieces in a too-small cracking zone.

2. The nutcracker of claim 1, wherein the interior surface comprises elongated protrusions that are slanted to be non-vertical and non-horizontal.

3. The nutcracker of claim 2, wherein the protrusions lie on the interior surface at 40-50 degrees from horizontal.

4. The nutcracker of claim 1, wherein the nutcracker further comprises:
    a housing;
    a rod axle extending from the cone for rotatably mounting the cone in the housing;
    a slanted plate connected to the housing, wherein the slanted plate is configured to receive the rod axle and allow the rod axle to spin within the slanted plate;
    a horizontal plate connected to the housing and holding a bearing configured to receive the rod axle and to allow the rod axle to spin within the bearing;
    wherein the horizontal plate extends horizontally only part-way across the housing, by extending from a first side of the housing to the slanted plate near said bearing and wherein the slanted plate slants downward from said first side of the housing to a spout that is located at a second, opposite side of the housing.

5. The nutcracker of claim 1, wherein, in the fully-lowered position, the bottom end of the interior surface is 0.2-0.3 inches from the exterior surface.

6. The nutcracker of claim 5, wherein, in the fully-raised position, the bottom end of the interior surface is 1.0-1.25 inches from the exterior surface.

7. The nutcracker of claim 5, wherein the exterior surface lies at an angle of 8-10 degrees from the interior surface.

8. The nutcracker of claim 6, wherein the exterior surface lies at an angle of 8-10 degrees from the interior surface.

9. The nutcracker of claim 1, wherein the nutcracker further comprises a roller frame mounted on the outside of the vertical cylinder, the roller frame comprising multiple rollers along vertical rails of the roller frame; and
wherein the vertical cylinder moves from the fully-lowered position to the fully-raised position by said rollers rolling along vertical channels in a housing.

10. The nutcracker of claim 9, wherein said roller frame comprises horizontal rings that surround the vertical cylinder.

11. The nutcracker of claim 9, wherein said rollers comprise multiple rollers at a lower level of the roller frame, multiple rollers at a middle level of the roller frame, and multiple rollers at an upper level of the roller frame, and wherein, when the vertical cylinder is in the fully-lowered position, all of the rollers are inside the housing, and, wherein, when the vertical cylinder is in the fully-raised position, only a portion of the rollers are inside the housing.

12. The nutcracker of claim 11, wherein, in the fully-raised position, ½-⅔ of the rollers are inside the housing and ½-⅓ of the rollers are above, and outside, the housing.

13. The nutcracker of claim 4, wherein the housing comprises multiple slanted members for directing shelled nuts and shells down and out of the nutcracker, said multiple slanted members comprising said slanted plate inside the housing, said spout extending out from the housing, and a slanted ring in the housing and extending from a location directly below the vertical cylinder to a higher location located radially outward from the vertical cylinder.

14. The nutcracker as in claim 1, wherein the vertical cylinder is moveable only up and down realtive to the cone during adjustment between said fully-lowered and said fully-raised positions, and is not moveable during use in cracking nuts.

15. A nutcracker comprising:
a housing for being set on a horizontal surface;
a right circular cone rotatably mounted in the housing, the cone having a textured exterior surface having a length between a top end and a bottom end of the exterior surface;
a vertical, right cylinder mounted in said housing between the cone and the housing, wherein the cylinder has a textured interior surface having a length between a top end and a bottom end of said interior surface;
wherein the cone is mounted so that its narrow end faces up and its broad end faces down, and so that an annular space, for receiving nuts for cracking, exists between said interior surface of the cylinder and said exterior surface of the cone;
wherein said interior surface and said exterior surface are non-parallel all along the length of the interior surface and all the length of the exterior surface so that the annular space between said interior surface and said exterior surface decreases linearly in width from top to bottom of the annular space, so that the annular space comprises a cracking zone around a lower portion of the interior surface of the cylinder, the cracking zone having a minimum width between the bottom end of the interior surface of the cylinder and the exterior surface of the cone, so that nuts received in the annular space fall down to be cracked in the cracking zone between the non-parallel interior and exterior surfaces;
an adjustment system adapted to move the cylinder between a raised position and a lowered position to adjust said minimum width from a first width when the cylinder is in the raised position to a second width when the cylinder is in the lowered position that is smaller than said first width;
said adjustment system comprising the cylinder having multiple rollers vertically spaced along the outside of the cylinder, and the housing having cooperating vertical rails that receive the rollers and allow the rollers to roll up and down the vertical rails as the cylinder is lowered or raised, and said adjustment system further comprising a manual actuator adapted to move the cylinder up and down and lock the cylinder at a selected level relative to the housing.

16. The nutcracker as in claim 15, wherein said interior surface and said exterior surface each have a plurality of protrusions that protrude into the annular space, said protrusions being elongated and non-vertical and non-horizontal.

17. The nutcracker as in claim 16, wherein said protrusions are elongated bar-like shapes that are slanted at 40-50 degrees relative to vertical.

18. A nutcracker comprising:
a housing for being set on a horizontal surface;
a right circular cone rotatably mounted in the housing, the cone having a textured exterior surface having a length between a top end and a bottom end of the exterior surface;
a vertical, right cylinder mounted in said housing between the cone and the housing, wherein the cylinder has a textured interior surface having a length between a top end and a bottom end of said interior surface;
wherein the cone is mounted so that its narrow end faces up and its broad end faces down, and so that an annular space, for receiving nuts for cracking, exists between said interior surface of the cylinder and said exterior surface of the cone, wherein said interior surface and said exterior surface are non-parallel all along the length of the interior surface and all along the length of the exterior surface, and the annular space comprises a cracking zone around a lower portion of the interior surface of the cylinder, the cracking zone having a minimum width between the bottom end of the interior surface of the cylinder and the exterior surface of the cone, so that nuts received in the annular space fall down to be cracked in the cracking zone between the non-parallel interior and exterior surfaces;
an adjustment system adapted to move the cylinder between a raised position and a lowered position to adjust said minimum width from a first minimum width when the cylinder is in the raised position to a second minimum width when the cylinder is in the lowered position that is smaller than said first width;
said adjustment system comprising the cylinder having multiple rollers vertically spaced along the outside of the cylinder, and the housing having cooperating vertical rails that receive the rollers and allow the rollers to roll up and down the vertical rails as the cylinder is lowered or raised, and said adjustment system further comprising a manual actuator adapted to move the cylinder up and down and lock the cylinder at a selected level relative to the housing.

* * * * *